(12) United States Patent
Carpenter et al.

(10) Patent No.: US 11,447,243 B2
(45) Date of Patent: Sep. 20, 2022

(54) HELICOPTER WITH ANTI-TORQUE SYSTEM, RELATED KIT AND METHODS

(71) Applicant: BLR Aerospace, L.L.C., Everett, WA (US)

(72) Inventors: Michael Carpenter, Everett, WA (US); Daniel A. Smith, Snohomish, WA (US)

(73) Assignee: BLR Aerospace, L.L.C., Everett, WA (US)

( * ) Notice: Subject to any disclaimer, the term of this patent is extended or adjusted under 35 U.S.C. 154(b) by 715 days.

(21) Appl. No.: 16/372,243

(22) Filed: Apr. 1, 2019

(65) Prior Publication Data

US 2019/0225331 A1     Jul. 25, 2019

Related U.S. Application Data

(63) Continuation of application No. 15/197,329, filed on Jun. 29, 2016, now Pat. No. 10,279,899.

(Continued)

(51) Int. Cl.
*B64C 27/82* (2006.01)
*B64C 23/06* (2006.01)
*B64C 7/00* (2006.01)

(52) U.S. Cl.
CPC ............... *B64C 27/82* (2013.01); *B64C 7/00* (2013.01); *B64C 23/06* (2013.01); *B64C 2027/8263* (2013.01); *Y02T 50/10* (2013.01)

(58) Field of Classification Search
CPC ............................... B64C 23/06; B64C 27/82
See application file for complete search history.

(56) References Cited

U.S. PATENT DOCUMENTS

| 1,893,064 A | 1/1933 | Zaparka |
| 2,338,935 A | 1/1944 | Raoul |

(Continued)

FOREIGN PATENT DOCUMENTS

| DE | 9012671 U1 | 11/1990 |
| DE | 102008015073 A1 | 10/2009 |

(Continued)

OTHER PUBLICATIONS

Chinese Search Report dated Jun. 22, 2020 for Chinese Application No. 2016800444688.6, 2 pages.

(Continued)

*Primary Examiner* — Joseph W Sanderson
(74) *Attorney, Agent, or Firm* — Cozen O'Connor

(57) ABSTRACT

A strake may extend along a portion of an approaching side of a tail boom of a helicopter. A number of vortex generators (VGs) may extend along a portion of a retreating side of the tail boom. For tail booms with circular cross sections, the strake and the VGs are positioned between approximately 5 and 15 degrees below a horizontal plane of the tail boom when viewed end on, on respective sides of the tail boom. For tail booms with non-circular cross sections, the strake and the VGs is positioned between approximately 5 and 15 degrees above a location where a change in curvature is greatest (e.g., where flow separation would otherwise occur) on a bottom half of the tail boom when viewed end on, on respective sides of the tail boom. A fairing may be located on the retreating side on the upper half of the tail boom, to create an asymmetric profile.

20 Claims, 11 Drawing Sheets

Related U.S. Application Data

(60) Provisional application No. 62/188,305, filed on Jul. 2, 2015.

(56) References Cited

U.S. PATENT DOCUMENTS

| | | | |
|---|---|---|---|
| 2,626,766 | A | 1/1953 | McDonald |
| 2,674,421 | A | 4/1954 | De |
| 2,862,361 | A | 12/1958 | Koup |
| 2,959,373 | A | 11/1960 | Zuck |
| 3,540,680 | A | 11/1970 | Peterson |
| 3,807,662 | A | 4/1974 | Velazquez |
| 3,966,145 | A | 6/1976 | Wiesner |
| 4,200,252 | A | 4/1980 | Logan et al. |
| 4,227,665 | A | 10/1980 | Carlson et al. |
| 4,247,061 | A | 1/1981 | Kuczynski et al. |
| D278,227 | S | 4/1985 | Johnston |
| 4,542,868 | A | 9/1985 | Boyd |
| 4,708,305 | A | 11/1987 | Kelley et al. |
| 4,948,068 | A | 8/1990 | Vanhorn |
| 5,209,430 | A | 5/1993 | Wilson et al. |
| 5,407,153 | A | 4/1995 | Kirk et al. |
| 5,492,448 | A | 2/1996 | Perry et al. |
| D425,853 | S | 5/2000 | Caporaletti |
| 6,352,220 | B1 | 3/2002 | Banks et al. |
| 6,416,015 | B1 | 7/2002 | Carson |
| 6,755,374 | B1 | 6/2004 | Carson |
| 6,863,240 | B1 | 3/2005 | Namisnak |
| 6,869,045 | B1 | 3/2005 | Desroche |
| 7,063,289 | B2 | 6/2006 | Desroche |
| 7,338,011 | B2 | 3/2008 | Pauly |
| 7,686,245 | B2 | 3/2010 | Heminway |
| 8,074,920 | B2 | 12/2011 | Mikulla |
| 8,074,926 | B2 | 12/2011 | Baker |
| 8,210,468 | B2 | 7/2012 | Desroche |
| 8,374,265 | B2 | 2/2013 | Tanaka et al. |
| 8,376,265 | B2 | 2/2013 | Desroche |
| 8,752,786 | B2 | 6/2014 | Sonneborn |
| 8,814,078 | B2 | 8/2014 | Brand et al. |
| 8,840,058 | B2 | 9/2014 | Brand et al. |
| 8,985,503 | B2 | 3/2015 | Desroche |
| 8,991,747 | B2 | 3/2015 | Desroche |
| 9,242,713 | B2 * | 1/2016 | D'Alascio ............ B64C 1/0009 |
| 10,279,899 | B2 * | 5/2019 | Carpenter ............ B64C 23/06 |
| 2003/0218102 | A1 | 11/2003 | Van et al. |
| 2004/0155157 | A1 | 8/2004 | Bray |
| 2005/0116116 | A1 | 6/2005 | Morgenstern |
| 2008/0149762 | A1 | 6/2008 | Baker |
| 2009/0008498 | A1 | 1/2009 | Desroche |
| 2009/0277991 | A1 | 11/2009 | Mikulla |
| 2009/0302167 | A1 | 12/2009 | Desroche |
| 2012/0091268 | A1 | 4/2012 | Baker |
| 2012/0256042 | A1 | 10/2012 | Altmikus et al. |
| 2012/0280079 | A1 | 11/2012 | Brand et al. |
| 2012/0312915 | A1 | 12/2012 | Sonneborn |
| 2013/0087653 | A1 | 4/2013 | Brand et al. |
| 2013/0214087 | A1 | 8/2013 | Corrigan et al. |
| 2014/0131517 | A1 | 5/2014 | D'Alascio et al. |
| 2014/0166804 | A1 | 6/2014 | Desroche |
| 2014/0317900 | A1 | 10/2014 | Desroche |

FOREIGN PATENT DOCUMENTS

| | | |
|---|---|---|
| EP | 0615903 A1 | 9/1994 |
| RU | 2206475 C2 | 6/2003 |
| RU | 2238221 C2 | 10/2004 |
| RU | 2281226 C1 | 8/2006 |
| WO | 2012039702 A1 | 3/2012 |

OTHER PUBLICATIONS

AugustaWestland, A Finmeccanica Company, "AW 169," Brochure, 2 pages, 2011.

Banks et al., "Exploratory Investigation of Aerodynamic Characteristics of Helicopter Tail Boom Cross-Section Models With Passive Venting," NASA/TP-200-210083, 52 pages, 2000.

Bell Helicopter, A Textron Company, "Bell 525 Relentless," Brochure, 2012, 4 pages.

Carpenter at al., "Helecopter With Anti-Torque System, Related Kit and Methods," United States U.S. Appl. No. 62/188,305, filed Jul. 2, 2015, 60 pages.

Desroche, "Aircraft Stabilization Systems and Methods of Modifying an Aircraft With the Same," Preliminary Amendment and Response to Restriction Requirement, filed Aug. 29, 2014, for U.S. Appl. No. 13/871,710, 14 pages.

Desroche, "Aircraft Stabilization Systems and Methods of Modifying an Aircraft With the Same," Response to Restriction Requirement, dated Aug. 29, 2014, for U.S. Appl. No. 14/228,120, 6 pages.

Desroche, "Aircraft Stabilization Systems and Methods of Modifying an Aircraft With the Same," U.S. Appl. No. 61/738,663, filed Dec. 18, 2012, 29 pages.

Desroche, "Aircraft Stabilization Systems and Methods of Modifying an Aircraft With the Same," U.S. Appl. No. 13/871,710, filed Apr. 26, 2013, 29 pages.

Desroche, "Aircraft Stabilization Systems and Methods of Modifying an Aircraft With the Same,", U.S. Appl. No. 61/816,507, filed Apr. 26, 2013, 34 pages.

Desroche, "Aircraft Stabilizer System and Methods of Using the Same," Amendment After Allowance (Under 37 CFR 1.312), filed May 10, 2012, for U.S. Appl. No. 12/152,661, 7 pages.

Desroche, "Aircraft Stabilizer System and Methods of Using the Same," Amendment Under 37 C.F.R § 1.111, Filed Oct. 4, 2012, for U.S. Appl. No. 13/485,623, 12 pages.

Desroche, "Aircraft Stabilizer System and Methods of Using the Same," Amendment, filed Dec. 7, 2011, for U.S. Appl. No. 12/152,661, 12 pages.

Desroche, "Aircraft Stabilizer System and Methods of Using the Same," Response to Restriction Requirement and Preliminary Amendment, dated Mar. 22, 2011, for U.S. Appl. No. 12/152,661, 11 pages.

Desroche, "Aircraft Stabilizer System and Methods of Using the Same," Supplemental Amendment, filed Dec. 30, 2011, for U.S. Appl. No. 12/152,661, 7 pages.

Desroche, "Aircraft Vertical Stabilizer," U.S. Appl. No. 60/930,233, filed May 14, 2007, 12 pages.

Desroche, "Apparatus and Method for Use on Aircraft With Spanwise Flow Inhibitors," Amendment, filed Apr. 22, 2010, for U.S. Appl. No. 11/509,326, 21 pages.

Desroche, "Helecopter Tail Section," Response, filed Jan. 23, 2006, for U.S. Appl. No. 10/954,035, 7 pages.

Desroche, "Helicopter Tail Section," Amendment, filed Jan. 12, 2006, for U.S. Appl. No. 10/954,035, 7 pages.

Extended European Search Report, dated Jan. 26, 2016, for European Application No. 13874489.1-1754, 8 pages.

Http://www.scalehelis.com/flyin/verUvert.html, retrieved from http://www.web.archive.org on Sep. 11, 2008, 3 pgs.

Http://www.scalehelis.com/flyin/verUvert12.jpg, retrieved from http://www.web.archive.org on Sep. 11, 2008, 1 pg.

International Search Report and Written Opinion of the International Searching Authority, dated Aug. 22, 2014, for corresponding International Application No. PCT/US2013/075783, 14 pages.

International Search Report and Written Opinion of the International Searching Authority, dated Aug. 22, 2014, for corresponding International Application No. PCT/US2014/035307, 13 pages.

International Search Report and Written Opinion of the International Searching Authority, dated Mar. 12, 2008, for corresponding International Application No. PCT/US2007/018747, 14 pages.

International Search Report and Written Opinion of the International Searching Authority, dated Mar. 3, 2009, for corresponding International Application No. PCT/US2008/006254, 13 pages.

International Search Report and Written Opinion, dated May 8, 2017, for International Application No. PCT/US2016/040082, 12 pages.

Ivchin et al., "Computing Experiment by Definition of Aerodynamic Characteristics of a Cylindrical Beam with a Strake," Scientific Bulletin of the Moscow State Technological University, Jan. 1, 2014, pp. 55-62 (with English Abstract).

(56) References Cited

OTHER PUBLICATIONS

Kelley et al., "Flight Investigation of the Effect of Tail Boom Strakes on Helicopter Directional Control," Journal of the American Helicopter Society 37(2):29-40, 1992.
Kelly et al., "Two-Dimensional Aerodynamic Characteristics of Several Polygon-Shaped Cross-Sectional Models Applicable to Helicopter Fuselages," NASA Technical Paper 3233, AVSCOM Technical Report 92-B-002, Aug. 1992, 31 pages.
Lockwood et al., "Flight Characteristics Test of the UH-60A with Tail Boom Mounted Strake," US Army Aviation Systems Command, US Army Aviation Engineering Flight Activity, Edwards Air Force Base, California USA AEFA Project No. 85-07, 1986, 31 pages.
Notice of Allowance, dated Apr. 13, 2006, for U.S. Appl. No. 10/954,035, Desroche, "Helicopter Tail Section and Retrofit Method," 6 pages.
Notice of Allowance, dated Dec. 18, 2014, for U.S. Appl. No. 13/871,710, Desroche, "Aircraft Stabilization Systems and Methods of Modifying an Aircraft With the Same," 8 pages.
Notice of Allowance, dated Dec. 8, 2014, for U.S. Appl. No. 14/228,120, Desroche, "Aircraft Stabilization Systems and Methods of Modifying an Aircraft With the Same," 8 pages.
Notice of Allowance, dated Mar. 7, 2012, for U.S. Appl. No. 12/152,661, Desroche, "Aircraft Stabilizer System and Methods of Using the Same," 7 pages.
Notice of Allowance, dated Nov. 14, 2012, for U.S. Appl. No. 13/485,623, Desroche, "Aircraft Stabilizer System and Methods of Using the Same," 8 pages.
Notice of Allowance, dated Oct. 6, 2004, for U.S. Appl. No. 10/799,508, Desroche, "Helicopter Tail Section and Retrofit Method," 10 pages.
Office Action, dated Aug. 15, 2012, for U.S. Appl. No. 13/485,623, Desroche, "Aircraft Stabilizer Systems and Methods of Using the Same," 10 pages.
Office Action, dated Aug. 29, 2005, for U.S. Appl. No. 10/954,035, Desroche, "Helicopter Tail Section," 10 pages.
Office Action, dated Feb. 22, 2011, for U.S. Appl. No. 12/152,661, Desroche, "Aircraft Stabilizer System and Methods of Using the Same," 7 pages.
Office Action, dated Jul. 21, 2014, for U.S. Appl. No. 13/871,710, Desroche, "Aircraft Stabilization Systems and Methods of Modifying an Aircraft With the Same," 9 pages.
Office Action, dated Jul. 6, 2010, for U.S. Appl. No. 11/509,326, Desroche, "Apparatus and Method for Use on Aircraft With Spanwise Flow Inhibitors," 7 pages.
Office Action, dated Jun. 7, 2011, for U.S. Appl. No. 12/152,661, Desroche, "Aircraft Stabilizer System and Methods of Using the Same," 9 pages.
Office Action, dated Nov. 23, 2009, for U.S. Appl. No. 11/509,326, Desroche, "Apparatus and Method for Use on Aircraft With Spanwise Flow Inhibitors," 7 pages.
Office Action, dated Sep. 11, 2014, for U.S. Appl. No. 13/871,710, Desroche, "Aircraft Stabilization Systems and Methods of Modifying an Aircraft With the Same," 6 pages.
Preliminary Amendment, filed Sep. 24, 2004, for U.S. Appl. No. 10/954,035, Desroche, "Helicopter Tail Section," 5 pages.
Response to Restriction Requirement and Preliminary Amendment, filed Nov. 11, 2014, for U.S. Appl. No. 13/871,710, Desroche, "Aircraft Stabilization Systems and Methods of Modifying an Aircraft With the Same," 15 pages.
Response to Restriction Requirement and Preliminary Amendment, filed Nov. 11, 2014, for U.S. Appl. No. 14/228,120, Desroche, "Aircraft Stabilization Systems and Methods of Modifying an Aircraft With the Same," 10 pages.
Response to Restriction Requirement, filed Sep. 3, 2009, for U.S. Appl. No. 11/509,326, Desroche, "Apparatus and Method for Use on Aircraft With Spanwise Flow Inhibitors," 3 pages.
Restriction Requirement, dated Aug. 3, 2009, for U.S. Appl. No. 11/509,326, Desroche, "Apparatus and Method for Use on Aircraft With Spanwise Flow Inhibitors," 7 pages.
Restriction Requirement, dated Jul. 21, 2014, for U.S. Appl. No. 14/228,120, Desroche, "Aircraft Stabilization Systems and Methods of Modifying an Aircraft With the Same," 8 pages.
Carpenter et al., "Helicopter With Anti-Torque System, Related Kit and Methods," AFCP Request and Amendment, filed Dec. 3, 2018, for U.S. Appl. No. 15/197,329, 11 pages.
Carpenter et al., "Helicopter With Anti-Torque System, Related Kit and Methods," Amendment, filed Oct. 23, 2018, for U.S. Appl. No. 15/197,329, 34 pages.
Final Office Action, dated Nov. 27, 2018, for U.S. Appl. No. 15/197,329, Carpenter et al., "Helicopter With Anti-Torque System, Related Kit and Methods," 8 pages.
Notice of Allowance, dated Dec. 14, 2018, for U.S. Appl. No. 15/197,329, Carpenter et al., "Helicopter With Anti-Torque System, Related Kit and Methods," 8 pages.
Office Action, dated Apr. 23, 2018, for U.S. Appl. No. 15/197,329, Carpenter, "Helicopter With Anti-Torque System, Related Kit and Methods," 11 pages.
Restriction Requirement, dated Sep. 11, 2014, for U.S. Appl. No. 14/228,120, Desroche, "Aircraft Stabilization Systems and Methods of Modifying an Aircraft With the Same," 6 pages.
Wilson et al., "Aerodynamic Characteristics of Several Current Helicopter Tail Book Cross Sections Including the Effect of Spoilers," NASA Technical Paper 2506, AVSCOM Technical Report 85-B-3, 1986, 73 pages.

* cited by examiner

HELICOPTER WITH ANTI-TORQUE SYSTEM, RELATED KIT AND METHODS

BACKGROUND

Technical Field

The present disclosure generally relates to helicopters, and more specifically to anti-torque devices that alter the aerodynamics of a helicopter.

Description of the Related Art

Traditional single rotor helicopters have a main lifting rotor ("main rotor") that provides a lifting force and a tail rotor that provides a laterally directed force used to counter reaction torque of the main rotor and adjust yaw alignment. The main rotor generates downwash that flows around the tail boom of the helicopter. It is known to include strakes on the approaching side of the tail boom to alter the flow of downwash from the rotating main rotor so as to generate a compensation force that at least partially counteracts the reaction torque produced by rotation of the main rotor. The "approaching side" of the tail boom is the side of the tail boom the main rotor blade approaches during rotation.

For example, U.S. Pat. No. 4,708,305 describes a system for controlling main rotor torque which reduces the power and size requirements of conventional anti-torque means (such as a tail rotor). Torque countering forces are generated by disrupting the main rotor downwash flowing around the fuselage. In particular, the downward flow is separated from the fuselage surface by strakes positioned at specified locations on the approaching side of the tail boom.

U.S. Pat. No. 8,210,468 describes a stabilizer system for a helicopter that includes strakes installed on the approaching side of the tail boom and a modified vertical stabilizer. The components of the stabilizer system cooperate to improve handling of the helicopter (e.g., increased cross wind tolerance), reduce fatigue (e.g., tail boom fatigue, fuselage fatigue, and the like), improve climb performance, improve cruise performance, increase control safety margins, combinations thereof, and the like.

U.S. Pat. No. 8,985,503 teaches locating strakes at two positions on the approaching side of the tail boom. A lower strake extends generally downward from a location of flow separation or maximum change in a curvature of an outer surface on a lower half of the tail boom. An upper strake extends generally upward from a location of maximum change in a curvature of the outer surface on an upper half of the tail boom. U.S. Pat. No. 8,985,503 also teaches inclusion of a fairing on a retreating side of the tail boom. The retreating side is the side of the tail boom that the main rotor retreats or moves away from during rotation. The fairing is located on the upper half of the tail boom. U.S. Pat. No. 8,985,503 further teaches locating a number of vortex generators on the retreating side of the tail boom. The vortex generators are positioned on the fairing, thus extending along a portion of the upper half of the tail boom. U.S. Pat. No. 8,991,747 teaches structures that are similar in some respects to those taught in U.S. Pat. No. 8,985,503.

BRIEF SUMMARY

A helicopter has a tail boom that extends rearwardly from a fuselage section of the helicopter. The tail boom includes an approaching boom side and retreating or exiting boom side that respectively extend vertically on opposite sides of a vertical plane of the tail boom. The helicopter includes a main rotor arranged to pass over the approaching boom side of the tail boom before passing over the retreating or exiting boom side of the tail boom in each of a plurality of rotations of the main rotor in a main rotor rotational direction.

Through analysis and/or testing, applicants have realized that the presence of strakes, as well as position of strakes on an approaching side of a tail boom can have an advantageous effect on performance. Likewise, applicants have realized that the position of vortex generators on the retreating side of a tail boom can have an advantageous effect on performance. Applicants have further realized that including a fairing, along with correctly positioned strakes and vortex generators, may further advantageously effect performance.

The preferred configuration of strake(s), vortex generator, and/or fairing is dependent on the shape of the tail boom.

For tail booms that have a circular cross section, a preferred configuration includes a strake located on an approaching side of the tail boom, on a lower half of the tail boom, positioned from approximately 5 degrees to 15 degrees below a horizontal plane of the tail boom when viewed along a length of the tail boom. For tail booms that have a circular cross section, a preferred configuration includes vortex generators located on a retreating side of the tail boom, on a lower half of the tail boom, positioned from approximately 5 degrees to 15 degrees below a horizontal plane of the tail boom when viewed along a length of the tail boom. An optional fairing may be located on the upper half of the retreating side of the tail boom, for example providing a smooth transition between a tail rotor drive shaft cover and the retreating side of the tail boom, or replacing an existing tail rotor drive shaft cover. Optionally, an upper strake may be employed with tail booms having a circular cross section. The upper strake may be located within approximately two inches of where a tail rotor drive shaft cover joins or intersects the tail boom.

For tail booms that have a non-circular (e.g., elliptical or oblong) cross section, a preferred configuration includes a strake located on an approaching side of the tail boom, on a lower half of the tail boom, positioned from approximately 5 degrees to 15 degrees above a location where a change in radius of curvature is greatest when viewed along a length of the tail boom, or where flow separation would occur in absence of the strake. Alternatively, for tail booms that have a non-circular (e.g., elliptical or oblong) cross section, the first strake position may be one in which an upstanding leg of the first strake is normal to the boom surface and from approximately 10 degrees to approximately 16 degrees, or more preferably approximately 13 degrees to approximately 14 degrees, to the horizontal (e.g., horizontal axis or midplane), where the upstanding leg is at an approximately right angle to a base of the first strake, which attaches the first strake to the tail boom. For tail booms that have a non-circular cross section (e.g., elliptical or oblong), a preferred configuration includes vortex generators located on a retreating side of the tail boom, on a lower half of the tail boom, positioned from approximately 5 degrees to 15 degrees above a location where a change in radius of curvature is greatest when viewed along a length of the tail boom, or where flow separation would occur in absence of the vortex generators. An optional fairing may be located on the upper half of the retreating side of the tail boom, for example providing a smooth transition between a tail rotor drive shaft cover and the retreating side of the tail boom, or replacing an existing tail rotor drive shaft cover. While an upper strake may be employed with non-circular tail booms that are not overly elongated, such are preferably omitted from tail booms. having elongated non-circular cross sections.

A strake positioned on a lower half of the tail boom as described herein, has an affect similar to that of an extended flap on a wing, increasing pressure on the approaching side relative to pressure on the retreating side of the tail boom. Vortex generators positioned on a lower half of the tail boom as described herein, promotes flow attachment from main rotor downwash, and thereby decrease pressure on the retreating side of the tail boom. Employing a fairing on the retreating side of the tail boom to create an asymmetric profile may promote flow attachment on the retreating side of the tail boom, and may improve the performance and/or stability and/or performance of the helicopter.

The various counter-torque structures and techniques described herein may significantly reduce the amount of power required to drive a tail rotor, may allow reduction in a size of a tail rotor or even a vertical stabilizer, may increase load capacity, and/or provide other advantages.

Strake(s), vortex generators and/or fairing may be installed by an original equipment manufacturer (OEM) or vendor during manufacture of a helicopter, before sale, lease or delivery to a customer. Alternatively, strake(s), vortex generators and/or fairing may be installed after manufacture of a helicopter, for instance after sale, lease or delivery to a customer. The strake(s), vortex generators and/or fairing may be supplied as an aftermarket kit, which includes instructions for placement and installation on a tail boom. The instructions may be specific to make and model of helicopter, or may provide position specification information based on a cross-sectional profile of the tail boom.

A helicopter may be summarized as including: a fuselage; a main rotor coupled to the fuselage and that in operation rotates in a first rotational direction with respect to the fuselage; an engine carried by the fuselage and drivingly coupled to rotate the main rotor in the first rotational direction with respect to the fuselage; a tail boom that extends rearwardly of the fuselage, the tail boom having an approaching side and a retreating side, the approaching side being a side of the tail boom that the main rotor approaches when rotating in the first rotational direction, the retreating side being a side of the tail boom that the main rotor retreats from when rotating in the first rotational direction, the retreating side opposite the approaching side across a width of the tail boom, the approaching side of the tail boom having a constant radius of curvature about a centerline, and the tail boom having an upper half, a lower a half and a horizontal plane that extends between the upper half and the lower half of the tail boom; and a first strake that extends outwardly from the approaching side of the tail boom, the first strake positioned below the horizontal plane of the tail boom at an angle of from approximately 5 degrees to 15 degrees, the angle measured between the horizontal plane, the centerline and an axis that extends from the centerline to the first strake.

The helicopter may further include: at least one vortex generator that extends outwardly from the retreating side of the tail boom, the at least one vortex generator positioned below the horizontal plane of the tail boom at an angle of from approximately 5 degrees to 15 degrees, the angle measured between the horizontal plane, the centerline and an axis that extends from the centerline to the at least one vortex generator. The tail boom may have a longitudinal axis, the first strake may be a retrofit strake and extend parallel to the longitudinal axis of the tail boom, and the vortex generator may extend nonparallel to the longitudinal axis of the tail boom. The helicopter may further include: a tail rotor positioned proximate a distal end of the tail boom and that in operation rotates in a tail rotor rotational direction; a tail rotor drive shaft drivingly coupled to the tail rotor; and a tail rotor drive shaft cover that extends along the tail boom and which removably covers the tail rotor drive shaft. The helicopter may further include: a second strake that extends outwardly from the approaching side of the tail boom, the second strake positioned proximate a location at which the tail rotor drive shaft cover joins the approaching side of the tail boom. The helicopter may further include: a second strake that extends outwardly from the approaching side of the tail boom, the second strake positioned within two inches above or below a location at which the tail rotor drive shaft cover joins the approaching side of the tail boom. The helicopter may further include: a fairing coupled on the retreating side of the tail boom to create an asymmetry between the approaching and the retreating side of the tail boom. The tail rotor drive shaft cover may have an apex, and the fairing may extend from the apex of the tail rotor drive shaft cover down to where the horizontal plane intersects the retreating side of the tail boom. The fairing may provide a smooth transition between the apex of the tail rotor drive shaft cover and the retreating side of the tail boom. The helicopter may further include: a fairing coupled on the retreating side of the tail boom to create an asymmetry between the approaching and the retreating side of the tail boom. The fairing may form a tail rotor drive shaft cover that removably covers the tail rotor drive shaft. The tail boom may taper in thickness as the tail boom is traversed from the fuselage to a distal end of the tail boom, the tail boom may extend in a vertical plane of the fuselage at an non-right angle from the fuselage, and the horizontal plane of the tail boom may not be horizontal to a surface of a ground or a horizontal plane of the fuselage.

A method of manufacturing a helicopter having a fuselage, a main rotor coupled to the fuselage and that in operation rotates in a first rotational direction with respect to the fuselage, an engine carried by the fuselage and drivingly coupled to rotate the main rotor in the first rotational direction with respect to the fuselage, and a tail boom that extends rearwardly of the fuselage, the tail boom having an approaching side and a retreating side, the approaching side being a side of the tail boom that the main rotor approaches when rotating in the first rotational direction, the retreating side being a side of the tail boom that the main rotor retreats from when rotating in the first rotational direction, the retreating side opposite the approaching side across a width of the tail boom, the approaching side of the tail boom having a constant radius of curvature about a centerline, and the tail boom having an upper half, a lower a half and a horizontal plane that extends between the upper half and the lower half of the tail boom, the method may be summarized as including: positioning a first strake to extend outwardly from the approaching side of the tail boom at a first strake position, the first strake position located below the horizontal plane of the tail boom at an angle of from approximately 5 degrees to 15 degrees, the angle measured between the horizontal plane, the centerline and an axis that extends from the centerline to the first strake position; and fixing the first strake to the approaching side of the tail boom at the first strake position.

The method may further include: positioning at least one vortex generator to extend outwardly from the retreating side of the tail boom at a vortex generator position, the at least one vortex generator position located below the horizontal plane of the tail boom at an angle of from approximately 5 degrees to 15 degrees, the angle measured between the horizontal plane, the centerline and an axis that extends from the centerline to the vortex generator position; and fixing the at least one vortex generator to the retreating side of the tail boom at the vortex generator position. The helicopter may further have a tail rotor positioned proximate a distal end of the tail boom and that in operation rotates in a tail rotor rotational direction, a tail rotor drive shaft drivingly coupled to the tail rotor; and a tail rotor drive shaft cover that extends along the tail boom and which removably covers the tail rotor drive shaft, and may further include: positioning a second strake to extend outwardly from the approaching side of the tail boom at a second strake position, the second strake position located within two inches above or below a location at which the tail rotor drive shaft cover joins the approaching side of the tail boom; and fixing the second strake to the approaching side of the tail boom at the second strake position. The method may further include: positioning a fairing on the retreating side of the tail boom at a fairing position to create an asymmetry between the approaching and the retreating side of the tail boom; and fixing the fairing at the fairing position. The helicopter may further have a tail rotor positioned proximate a distal end of the tail boom and that in operation rotates in a tail rotor rotational direction, a tail rotor drive shaft drivingly coupled to the tail rotor; and a tail rotor drive shaft cover that extends along the tail boom and which removably covers the tail rotor drive shaft, the tail rotor drive shaft cover having an apex, and may further include: positioning a fairing on the retreating side of the tail boom at a fairing position in which the fairing extends from the apex of the tail rotor drive shaft cover down to where the horizontal plane intersects the retreating side of the tail boom. The helicopter may further have a tail rotor positioned proximate a distal end of the tail boom and that in operation rotates in a tail rotor rotational direction, a tail rotor drive shaft drivingly coupled to the tail rotor; and a tail rotor drive shaft cover that extends along the tail boom and which removably covers the tail rotor drive shaft, the tail rotor drive shaft cover having an apex, and may further include: removing the tail rotor drive shaft cover; and positioning a fairing at a fairing position in which the fairing covers the tail rotor drive shaft and extends down a portion of the retreating side of the tail boom.

A retrofit kit for a helicopter may be summarized as including: a first strake; and instructions that instruct a user to position the first strake to extend outwardly from an approaching side of a tail boom at a first strake position, the first strake position located below a horizontal plane of the tail boom at an angle of from approximately 5 degrees to 15 degrees, the angle measured between the horizontal plane, a centerline of the tail boom and an axis that extends from the centerline to the first strake position.

The retrofit kit may further include: at least one vortex generator, wherein the instructions instruct the user to position the at least one vortex generator to extend outwardly from a retreating side of the tail boom at a vortex generator position, the at least one vortex generator position located below the horizontal plane of the tail boom at an angle of from approximately 5 degrees to 15 degrees, the angle measured between the horizontal plane, the centerline and an axis that extends from the centerline to the vortex generator position. The retrofit kit may further include: a second strake, wherein the instructions instruct the user to position the second strake to extend outwardly from the approaching side of the tail boom at a second strake position, the second strake position located within two inches above or below a location at which a tail rotor drive shaft cover joins the approaching side of the tail boom. The retrofit kit may further include: a fairing, wherein the instructions instruct the user to position the fairing on the retreating side of the tail boom at a fairing position to create an asymmetry between the approaching and the retreating side of the tail boom. The instructions may instruct the user to position the fairing to extend from an apex of the tail rotor drive shaft down to where the horizontal plane of the tail boom intersects the retreating side of the tail boom. The instructions may instruct the user to: remove a tail rotor drive shaft cover; and position the fairing to cover a tail rotor drive shaft and extend part way down the retreating side of the tail boom.

A helicopter may be summarized as including: a fuselage; a main rotor coupled to the fuselage and that in operation rotates in a first rotational direction with respect to the fuselage; an engine carried by the fuselage and drivingly coupled to rotate the main rotor in the first rotational direction with respect to the fuselage; a tail boom that extends rearwardly of the fuselage, the tail boom having an approaching side and a retreating side, the approaching side being a side of the tail boom that the main rotor approaches when rotating in the first rotational direction, the retreating side being a side of the tail boom that the main rotor retreats from when rotating in the first rotational direction, the retreating side opposite the approaching side across a width of the tail boom, the approaching side of the tail boom having a varying radius of curvature about a centerline, and the tail boom having an upper half, a lower a half and a horizontal plane that extends between the upper half and the lower half of the tail boom; and a first strake that extends outwardly from the approaching side of the tail boom, the first strake positioned below the horizontal plane of the tail boom at a position that is from approximately 5 degrees to 15 degrees above a location at which a change in the radius of curvature of the approaching side below the horizontal plane is greatest.

The retreating side of the tail boom may have a varying radius of curvature about the centerline of the tail boom, and the helicopter may further include: at least one vortex generator that extends outwardly from the retreating side of the tail boom, the at least one vortex generator positioned below the horizontal plane of the tail boom at a position that is from approximately 5 degrees to 15 degrees above a location at which a change in the radius of curvature of the retreating side below the horizontal plane is greatest. The tail boom may have a longitudinal axis, the first strake may be a retrofit strake and extends parallel to the longitudinal axis of the tail boom, and the vortex generator may extend nonparallel to the longitudinal axis of the tail boom. The helicopter may further include: a fairing coupled on the retreating side of the tail boom to create an asymmetry between the approaching and the retreating side of the tail boom. The helicopter may further include: a tail rotor positioned proximate a distal end of the tail boom and that in operation rotates in a tail rotor rotational direction; a tail rotor drive shaft drivingly coupled to the tail rotor; and a tail rotor drive shaft cover that extends along the tail boom and which removably covers the tail rotor drive shaft. The tail rotor drive shaft cover may have an apex, and the fairing may extend from the apex of the tail rotor drive shaft cover down to where the horizontal plane intersects the retreating side of the tail boom. The fairing may provide a smooth transition between the apex of the tail rotor drive shaft and the retreating side of the tail boom. The helicopter may further include: a tail rotor positioned proximate a distal end of the tail boom and that in operation rotates in a tail rotor rotational direction; and a tail rotor drive shaft drivingly coupled to the tail rotor, wherein the fairing forms a tail rotor drive shaft cover that removably covers the tail rotor drive shaft. The tail boom may taper in thickness as the tail boom is traversed from the fuselage to a distal end of the tail boom, the tail boom may extend in a vertical plane of the fuselage at an non-right angle from the fuselage, and the horizontal plane of the tail boom may not be horizontal to a surface of a ground or a horizontal plane of the fuselage. The radius of curvature of the approaching side may be smoothly continuously varying, interrupted only by the first strake.

A method of manufacturing a helicopter having a fuselage, a main rotor coupled to the fuselage and that in operation rotates in a first rotational direction with respect to the fuselage, an engine carried by the fuselage and drivingly coupled to rotate the main rotor in the first rotational direction with respect to the fuselage, and a tail boom that extends rearwardly of the fuselage, the tail boom having an approaching side and a retreating side, the approaching side being a side of the tail boom that the main rotor approaches when rotating in the first rotational direction, the retreating side being a side of the tail boom that the main rotor retreats from when rotating in the first rotational direction, the retreating side opposite the approaching side across a width of the tail boom, the approaching side of the tail boom having a varying radius of curvature about a centerline, and the tail boom having an upper half, a lower a half and a horizontal plane that extends between the upper half and the lower half of the tail boom, the method may be summarized as including: positioning a first strake to extend outwardly from the approaching side of the tail boom at a first strake position, the first strake position located below the horizontal plane of the tail boom at a position that is from approximately 5 degrees to 15 degrees above a location at which a change in the radius of curvature of the approaching side below the horizontal plane is greatest; and fixing the first strake to the approaching side of the tail boom at the first strake position.

The retreating side of the tail boom may have a varying radius of curvature about the centerline of the tail boom, and the method may further include: positioning at least one vortex generator to extend outwardly from the retreating side of the tail boom at a vortex generator position, the at least one vortex generator position located below the horizontal plane of the tail boom at a position that is from approximately 5 degrees to 15 degrees above a location at which a change in the radius of curvature of the retreating side below the horizontal plane is greatest; and fixing the at least one vortex generator to the retreating side of the tail boom at the vortex generator position. The method may further include: positioning a fairing on the retreating side of the tail boom at a fairing position to create an asymmetry between the approaching and the retreating side of the tail boom; and fixing the fairing at the fairing position. The tail rotor drive shaft cover may have an apex, and positioning a fairing on the retreating side of the tail boom at a fairing position may include positioning the fairing to extend from the apex of the tail rotor drive shaft cover down to where the horizontal plane intersects the retreating side of the tail boom. The method may further include: removing a tail rotor drive shaft cover; and positioning a fairing at a fairing position to cover the tail rotor drive shaft and create an asymmetry between the approaching and the retreating side of the tail boom; and fixing the fairing at the fairing position.

A retrofit kit for a helicopter may be summarized as including: a first strake; and instructions that instruct a user to position the first strake to extend outwardly from the approaching side of the tail boom at a first strake position, the first strake position located below the horizontal plane of the tail boom at a position that is from approximately 5 degrees to 15 degrees above a location at which a change in the radius of curvature of the approaching side below the horizontal plane is greatest.

The retrofit kit may further include: at least one vortex generator, wherein the instructions instruct the user to position the at least one vortex generator to extend outwardly from the retreating side of the tail boom at a vortex generator position, the at least one vortex generator position located below the horizontal plane of the tail boom at a position that is from approximately 5 degrees to 15 degrees above a location at which a change in the radius of curvature of the retreating side below the horizontal plane is greatest. The retrofit kit may further include: a fairing, wherein the instructions instruct the user to position to create an asymmetry between the approaching and the retreating side of the tail boom. The instructions may instruct the user to position the fairing to extend from an apex of the tail rotor drive shaft cover down to where the horizontal plane of the tail boom intersects the retreating side of the tail boom. The instructions may instruct the user to remove a tail rotor drive shaft cover and position the fairing to cover the tail rotor drive shaft and extend part way down the retreating side of the tail boom.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various embodiments of the invention. However, one skilled in the art will understand that the invention may be practiced without these details. Tail boom modification systems are disclosed in the context of tail sections of helicopters because they have particular utility in this context. However, these modifications can be incorporated into other types of aircraft in which aerodynamics is a significant consideration. Terms, such as "rear," "front," "rearward," "forward," "counter clockwise," "clockwise," "upward," and "downward," and variations thereof are used to describe the illustrated embodiments and are used consistently with the description of non-limiting exemplary applications. It will be appreciated, however, that the illustrated embodiments can be located or oriented in a variety of desired positions.

As used herein and in the claims, terms such as cross-section, cross-sectional profile, profile and radius of curvature refer to the outer skin of the tail boom, including a fairing if suggested by the context, and which does not include any strakes, vortex generators or similar structures that extend outward at an abrupt angle from the surface of the outer skin. The outer skin is typically a closed surface.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The Abstract of the Disclosure provided herein is for convenience only and does not interpret the scope or meaning of the embodiments.

Figure 1A:
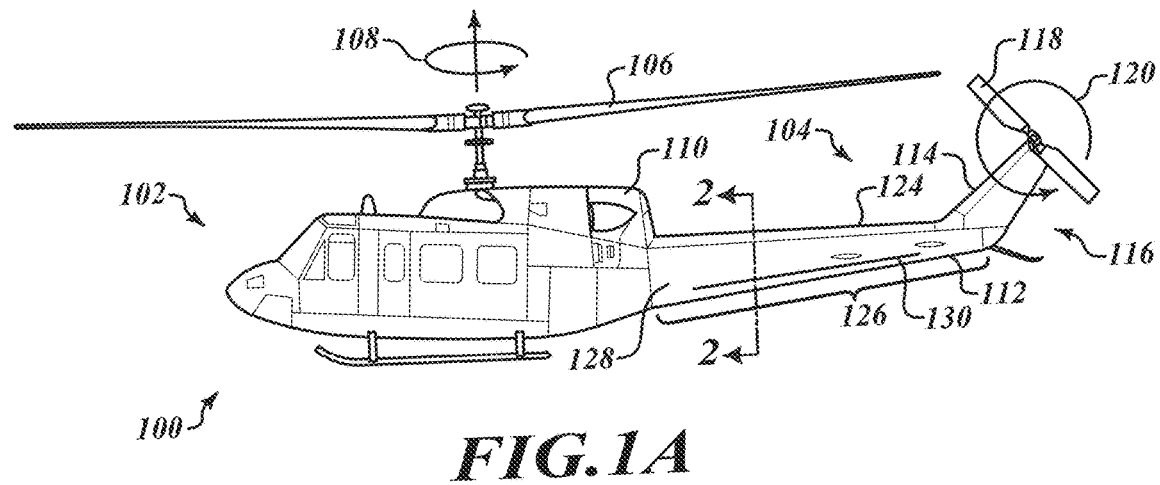
FIG. 1A is an approaching side elevational view of a helicopter showing a strake, according to at least one illustrated embodiment.
Figure 1B:
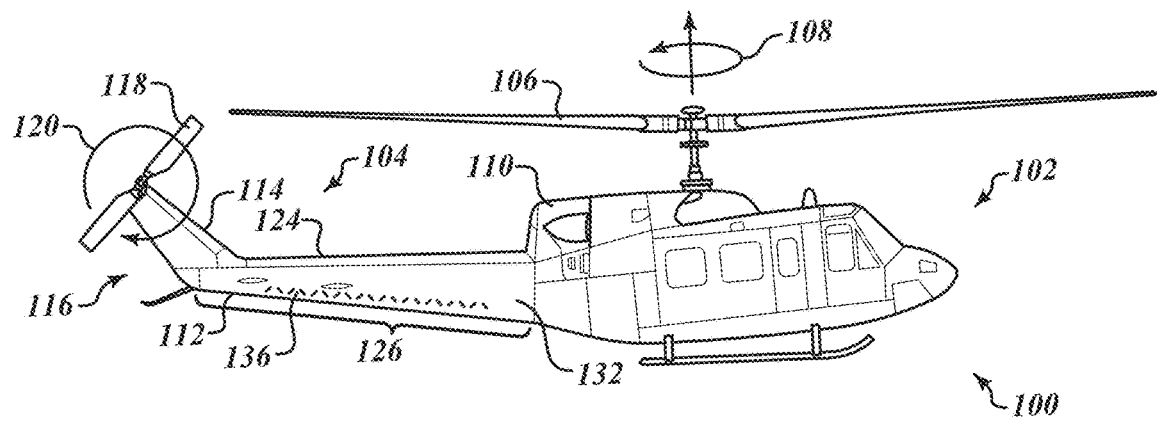
FIG. 1B is a retreating side elevational view of the helicopter of FIG. 1A, showing vortex generators.

FIGS. 1A and 1B show a helicopter 100 including a cabin fuselage section 102 and a tail section 104 connected to and extending rearwardly from the cabin fuselage section 102. A main rotor 106 is coupled to the fuselage section 102. In operation, the main rotor 106 rotates in a first rotational direction (indicated by arrow 108) with respect to the fuselage section 102, which provides a lifting force. An engine 110 carried by the fuselage section 102 is drivingly coupled to rotate the main rotor 106 in the first rotational direction 108.

The tail section 104 includes a tail boom 112 that extends rearwardly of the fuselage section 102. The tail section 104 includes a vertical stabilizer 114 fixedly coupled proximate a distal end 116 of the tail section 104. A tail rotor 118 is rotatably coupled to the vertical stabilizer 114. In operation, the tail rotor 118 rotates in a tail rotor rotational direction (indicated by arrow 120), that is about an axis that typically is approximately perpendicular to an axis about which the main rotor 106 rotates. A tail rotor drive shaft cover 124 extends along at least a portion of a length 126 of the tail boom 112, and which removably covers a drive shaft 122 (best illustrated in FIG. 3A-3C). The drive shaft 122 is drivingly coupled to the tail rotor 118, for example from the engine 110.

As best illustrated in FIG. 1A, the tail boom 112 has an approaching side 128. The approaching side 128 is the side of the tail boom 112 that blade of the main rotor 106 approaches when rotating in the first rotational direction 108. For example, the approaching side 128 may be a left or port side of the tail boom 112 or fuselage section 102. A first strake 130 extends along at least a portion the length 126 of the tail boom 112. As described herein, the first strake 130 is positioned or oriented at a first strake position on a lower half of the tail boom 112.

As best illustrated in FIG. 1B, the tail boom 112 has a retreating side 132. The retreating side 132 is the side of the tail boom 112 that blade of the main rotor 106 retreats from when rotating in the first rotational direction 108. For example, the retreating side 132 may be a right or starboard side of the tail boom 150 or fuselage 104. The retreating side 132 is opposite the approaching side 128 across a width 134 of the tail boom 112. A number of vortex generators 136 are positioned along at least a portion the length 126 of the tail boom 112. As described herein, the vortex generators 136 are positioned or oriented to partially counteract torque produced by the main rotor 106, as at least part of the anti-torque system.

The first strake 130 extends parallel to a longitudinal axis of the tail boom 112. The first strake 130 may take the form of a retrofit strake, or may be installed by the original equipment manufacturer. The vortex generators 136 are distributed along the longitudinal axis of the tail boom 112, but are each individually nonparallel to the longitudinal axis of the tail boom 112, for instance at a 45 degree angle, 60 degree angle, 30 degree angle.

As illustrated in FIGS. 1A and 1B, the tail boom 150 may taper in thickness as the tail boom 150 is traversed from the fuselage to a distal end of the tail boom 150. Typically, the tail boom 150 extends in a vertical plane of the fuselage at an non-right angle from the fuselage, generally angled relatively upwardly from the fuselage toward the distal end of the tail boom 150. Thus, the horizontal plane of the tail boom 150 is typically not horizontal to a surface of a ground or a horizontal plane of the fuselage 104.

While not bound by theory, positioning or orienting the first strake 130 as described herein, causes the first strake 130 to act in a similar fashion to a flap on a wing, at least partially counteracting torque produced by the main rotor 104, as at least part of an anti-torque system. The first strake 130 positioned or oriented as described herein may advantageously push some of the downwash laterally away from the approaching side 128, creating a counter force that pushes the tail boom 112 toward the retreating side 132 (i.e., in the same direction as tail rotor thrust, into the drawing sheet for FIG. 1A, out of the drawing sheet for FIG. 1B), while also increasing a pressure difference between the approaching side 128 and retreating side 132, increasing a "lift" force that draws the tail boom 112 toward the retreating side 132.

While also not being bound by theory, positioning or orienting the vortex generators 136 as described herein, reenergizes the flow slightly downstream of a location at which flow would otherwise stagnate in absence of the vortex generators 136, at least partially counteracting torque produced by the main rotor 106, as at least part of an anti-torque system. The vortex generators 136 positioned or oriented as described herein may advantageously increase a pressure difference between the approaching side 128 and retreating side 132, increasing a "lift" force that draws the tail boom 112 toward the retreating side 132 (i.e., in the same direction as tail rotor thrust, into the drawing sheet for FIG. 1A, out of the drawing sheet for FIG. 1B).

Figure 2A:
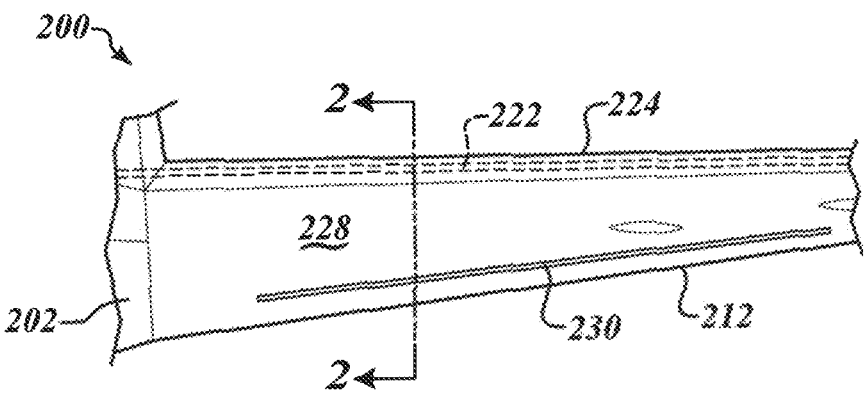
FIG. 2A is a partial, enlarged, elevation view of a helicopter with the tail boom, showing the approaching side of a tail boom in more detail.
Figure 2B:
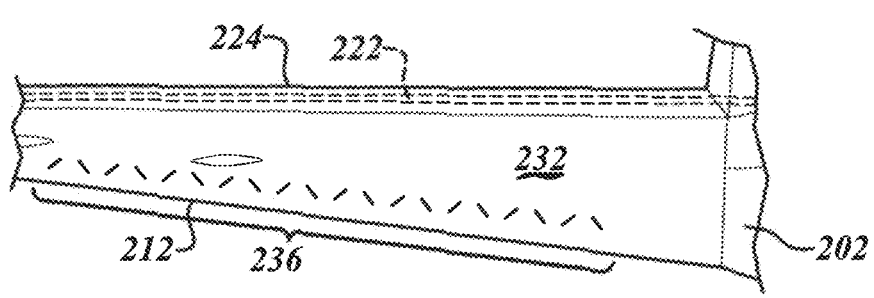
FIG. 2B is a partial, enlarged, elevation view of a helicopter with the tail boom of FIG. 2A, showing the retreating side of a tail boom in more detail.
Figure 2C:
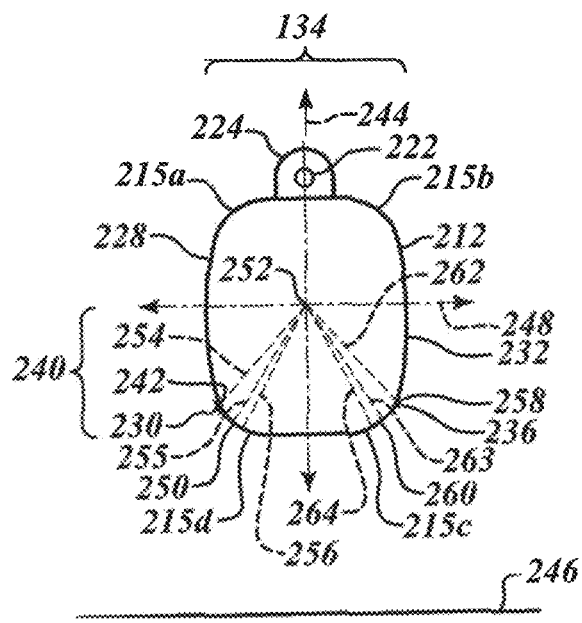
FIG. 2C is a cross-sectional view of the tail boom illustrated in FIGS. 2A and 2B, taken along section line 2 (FIG. 2A), showing a non-circular profile of the tail boom and respective positions of the strake and vortex generators on the approaching and retreating sides of the tail boom, respectively.

FIGS. 2A-2C show a portion of a helicopter 200, according to one illustrated embodiment.

The helicopter 200 may be similar or even identical to the helicopter 100 of FIGS. 1A and 1B. The helicopter 200 includes a tail boom 212 that extends rearwardly from a cabin fuselage section 202 (FIGS. 2A, 2B). As best illustrated in FIG. 2C, the tail boom 212 has a non-circular cross-sectional profile, for instance with shoulders 215a, 215b, 215c, 215d (FIG. 2C). The helicopter 200 includes a tail rotor drive shaft 222 that drivingly couples a tail rotor (not illustrated in FIGS. 2A-2C) to an engine (not illustrated in FIGS. 2A-2C) of the helicopter 200. A tail rotor drive shaft cover 224 may be positioned on the tail boom 212 to cover the tail rotor drive shaft 222. The tail rotor drive shaft cover may be removably fastened to the tail boom 212, to allow inspection and servicing of the tail rotor drive shaft 222.

A first strake 230 is positioned on an approaching side 228 of the tail boom 212, extending along at least a portion of a length 126 (FIGS. 1A, 1B) of the tail boom 212, on a lower half 240 (FIG. 2C) of the tail boom 212 at a first strake position 242.

As best illustrated in FIG. 2C, the tail boom 212 may have a vertical axis or midplane 244 (e.g., plane of symmetry that extends generally vertically in a frame of reference of the helicopter 200, fuselage section 202 or ground 246 when on level ground 246). The tail boom 212 may have a horizontal axis or midplane 248 (e.g., plane of symmetry that extends generally horizontally in a frame of reference of the helicopter 200, fuselage section 202 or ground 246 when on level ground 246, taking into account any angle that the tail boom 212 may form with respect to the fuselage section 202 or any taper in the tail boom 212 as the tail boom 212 is traversed from the fuselage section 202 to a distal end 116 (FIGS. 1A, 1B) of the tail boom 212).

For a tail boom 212 with a non-circular cross-sectional profile, the first strake position 242 is positioned, oriented and/or located on the approaching side 228 of the tail boom 212, on a lower half 240 of the tail boom 212, positioned from approximately 5 degrees to 15 degrees above a location 250 where a change in radius of curvature of the surface of the approaching side 228 is greatest when viewed along a length of the tail boom 212, or where flow separation would occur in absence of the first strake 230. An exemplary angle between the location 250 of greatest change in radius of curvature on the lower half 240 of the approaching side 228, a center location 252 (e.g., where vertical and horizontal midplanes 244, 248 intersect), and the first strake position 242 is best illustrated between axes 254, 256 in FIG. 2C. The ray 254 corresponds to a 15 degree angle. The ray 255 corresponds to a 5 degree angle.

Alternatively, for a tail boom 212 with a non-circular cross-sectional profile, the first strake position 242 is positioned, oriented and/or located on the approaching side 228 of the tail boom 212, on a lower half 240 of the tail boom 212, such that an upstanding leg of the first strake 230 is normal to the boom surface and from approximately 10 degrees to approximately 16 degrees, or more preferably approximately 13 degrees to approximately 14 degrees to the horizontal (e.g., horizontal axis or midplane 248), where the upstanding leg is at an approximately right angle to a base of the first strake 230, which attaches the first strake 230 to the tail boom 212. The term approximately when used in conjunction with angles or degrees includes variations of plus or minus 3 degrees.

A number of vortex generators 236 are positioned on an retreating side 232 of the tail boom 212, extending along at least a portion of a length 126 (FIGS. 1A, 1B) of the tail boom 212, on a lower half 240 (FIG. 3C) of the tail boom 212 at a vortex generator position 258.

For a tail boom 212 with a non-circular cross-sectional profile, the vortex generators 236 are positioned, oriented and/or located on the retreating side 232 of the tail boom 212, on the lower half 240 of the tail boom 212, positioned from approximately 5 degrees to 15 degrees above a location 260 where a change in radius of curvature of the surface of the retreating side 232 is greatest when viewed along a length of the tail boom 212, or where flow separation would occur in absence of the vortex generators 236. An exemplary angle between the location 260 of greatest change in radius of curvature on the lower half 240 of the retreating side 232, a center location 252 (e.g., where vertical and horizontal midplanes 244, 248 intersect), and the vortex generator position 258 is best illustrated between axes 262, 264 in FIG. 2C. The ray 262 corresponds to a 15 degree angle. The ray 263 corresponds to a 5 degree angle.

Figure 3A:
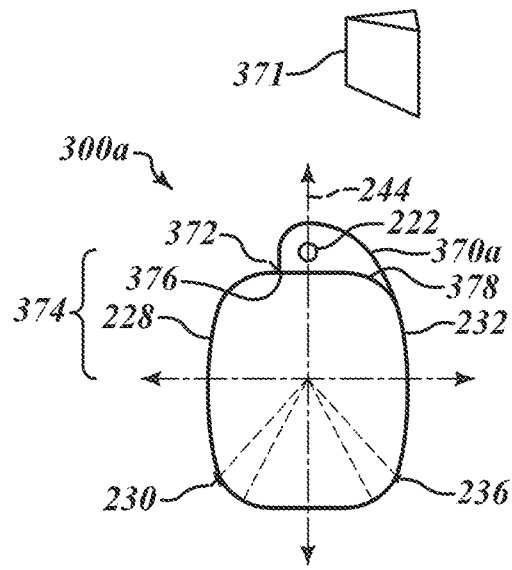
FIG. 3A is a cross-sectional view of a tail boom similar to that illustrated in FIGS. 2A-2C, with the additional of a fairing that replaces a tail rotor drive shaft cover to create an asymmetric tail boom profile, according to one illustrated embodiment.

FIG. 3A shows a portion of a helicopter 300a, according to one illustrated embodiment.

The helicopter 300a may be similar or even identical to the helicopter 100 of FIGS. 1A and 1B. The helicopter 300a includes many of the same or similar structures to that illustrated in FIGS. 2A-2C. Identical or similar are denominated with the same reference numbers as employed in FIGS. 2A-2C. Some structures are not specifically called out in FIG. 3A to enhance drawing legibility. Only significant differences with that of FIGS. 2A-2C are discussed below.

In addition to the first strake 230 and vortex generators 236, the helicopter 300a optional includes a fairing 370a that extends along at least a portion of the length 126 (FIGS. 1A, 1B) of the tail boom 212. For example, the fairing 370a may extend along a portion of the tail boom 212 that experiences rotor wash from a main rotor 106 (FIGS. 1A, 1B). The combination of the fairing 370a and the tail boom 212 results in the tail section 104 (FIGS. 1A, 1B) having an asymmetrical cross-sectional profile across the vertical axis or midplane 244. This asymmetrical cross-sectional profile is shaped to produce lift on the retreating side 232, thus the fairing 370a at least partially counteracts main rotor torque produced by the main rotor 106 (FIGS. 1A, 1B), as at least part of the anti-torque system. The fairing 370a may be positioned to cover the tail rotor drive shaft 222. For example, the fairing 370a may be a replacement for a tail rotor drift shaft cover 224 (FIG. 3A) that came with the helicopter 300a. The fairing 370b can extend at least part way down the retreating side 232 of the tail boom 212, providing a smooth transition therewith. The fairing 370b can be supplied as an aftermarket kit, along with strake(s) 230 and/or vortex generators 236, and instructions 371 for installing such at the various locations described herein. Alternatively, the fairing 370a may be part of the helicopter 300a as manufactured and/or delivered by an OEM.

Optionally, a second strake 372 is positioned on the approaching side 228 of the tail boom 212, extending along at least a portion of a length 126 (FIGS. 1A, 1B) of the tail boom 212, on an upper half 374 of the tail boom 212 at a second strake position 376. The second strake position 376 is preferably within a few inches of where the fairing 370a joins the tail boom 212 on an upper portion 378 of the tail boom 212. The second strake 372 may be employed with tail booms having a circular cross-sectional profile or almost circular cross-sectional profiles (e.g., FIG. 3A), and which are not overly elongated or overly elliptical (e.g., FIG. 6). Applicants have found it advantageous to omit a second strake 372, at least for tail booms with overly elongated or overly elliptical cross-sectional profiles. The second strake 372 adds weight, and tends to create a down force penalty, so any advantage in producing flow separation on the approaching side 228 is at least partially, if not wholly, offset.

Figure 3B:
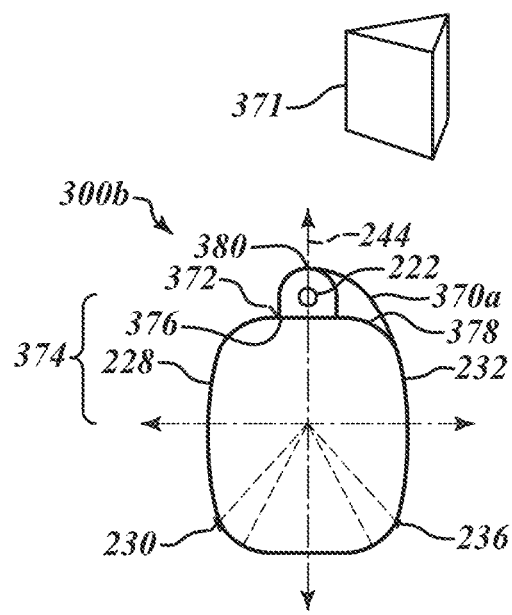
FIG. 3B is a cross-sectional view of a tail boom similar to that illustrated in FIGS. 2A-2C, with the addition of a fairing on the retreating side that extends from a tail rotor drive shaft cover create an asymmetric tail boom profile, according to one illustrated embodiment.

FIG. 3B shows a portion of a helicopter 300b, according to one illustrated embodiment.

The helicopter 300b may be similar or even identical to the helicopter 100 of FIGS. 1A and 1B. The helicopter 300b includes many of the same or similar structures to that illustrated in FIGS. 2A-2C. Identical or similar are denominated with the same reference numbers as employed in FIGS. 2A-2C, and 3A. Some structures are not specifically called out in FIG. 3B to enhance drawing legibility. Only significant differences with that of FIGS. 2A-2C and 3A are discussed below.

In addition to the first strake 230 and vortex generators 237, the helicopter 300a optional includes a fairing 370b that extends along at least a portion of the length 126 (FIGS. 1A, 1B) of the tail boom 212. For example, the fairing 370b may extend along a portion of the tail boom 212 that experiences main rotor wash from a main rotor 106 (FIGS. 1A, 1B). The combination of the fairing 370b and the tail boom 212 results in the tail section 104 (FIGS. 1A, 1B) having an asymmetrical cross-sectional profile across the vertical axis or midplane 244. This asymmetrical cross-sectional profile is shaped to produce lift on the retreating side 232, thus the fairing 370b at least partially counteracts main rotor torque produced by the main rotor 106, as at least part of the anti-torque system.

In contrast to the fairing 370a (FIG. 3A), the fairing 370b may be positioned adjacent the tail rotor drive shaft cover 222. For example, the fairing 370b may extend from a vertical apex 380 of the tail rotor drive shaft cover 222, down at least a portion of the retreating side 232 of the tail boom 212. The fairing 370b may provide a smooth transition between the tail rotor drive shaft cover 222 and the retreating side 232 of the tail boom 212. The fairing 370b can be supplied as an aftermarket kit, along with strake(s) and/or vortex generators, and instructions 371 for installing such at the various locations described herein. Alternatively, the fairing may be part of the helicopter as manufactured and/or delivered by an OEM.

As can be seen in FIGS. 3A and 3B, the aerodynamic fairing 370a, 370b eliminates the shoulder 215b on the retreating side 232 of the tail boom 212. In some implementations, the upper or second strake 372 may be attached to the fairing 370a, 370b, before the fairing 370a, 370b is attached to the tail boom 212.

Altering a cross-sectional profile of a tail section 104 (FIGS. 1A, 1B) of a helicopter to make the retreating side 232 of the tail boom 212 (the side opposite the approaching side 228) more aerodynamic in a way that promotes flow attachment on the retreating side 232 of the tail boom 212 has many benefits. For example, altering the profile of the retreating side 232 of the tail boom 212 or tail section 104 can, among other benefits: (i) remove downforce penalties resulting from a disadvantageously shape tail section profile; (ii) result in horsepower savings by at least partially counteracting the reaction torque produced by rotation of the main rotor; and (iii) and can improve directional control by promoting a reduction in what is known as "loss of tail rotor effectiveness" (in helicopters that include a main rotor that rotates counterclockwise) or "uncommanded left yaw" (in helicopters that include a main rotor that rotates counterclockwise).

Such may include altering a profile of the tail section 104 to slow flow on the approaching side 228 of the tail boom 212 and speed up air flow on the retreating (i.e., opposite) side 232 of the tail boom 212 or tail section 104. The alteration can be achieved by removing an existing tail rotor drive shaft cover 222 from the tail boom 215 and replacing it with a tail rotor drive shaft cover that has a more aerodynamic profile. The alteration can also be achieved by adding structure to the tail boom 212 or tail section 104. The resulting tail section 104 can have a cross-sectional profile that resembles an airfoil (e.g. having a continuous cambered surface). The alteration may, or may not include the addition of strakes 230 to the approaching side 228 of the tail boom 212 and vortex generators 236 to the retreating side 232. Although some of the examples discussed herein relate to modifications of tail booms or tail sections that include a separate tail rotor drive shaft cover, the principles of the present disclosure are also applicable to modifications of tail booms 212 or tail sections 104 in which the tail rotor drive shaft 222 is housed entirely within the tail boom 212. In such cases, the modification may include, for example, the addition of at least one structural element to at least the opposite side of the tail boom 212 or tail section 104 to improve the aerodynamic profile of the tail boom 212.

Figure 4A:
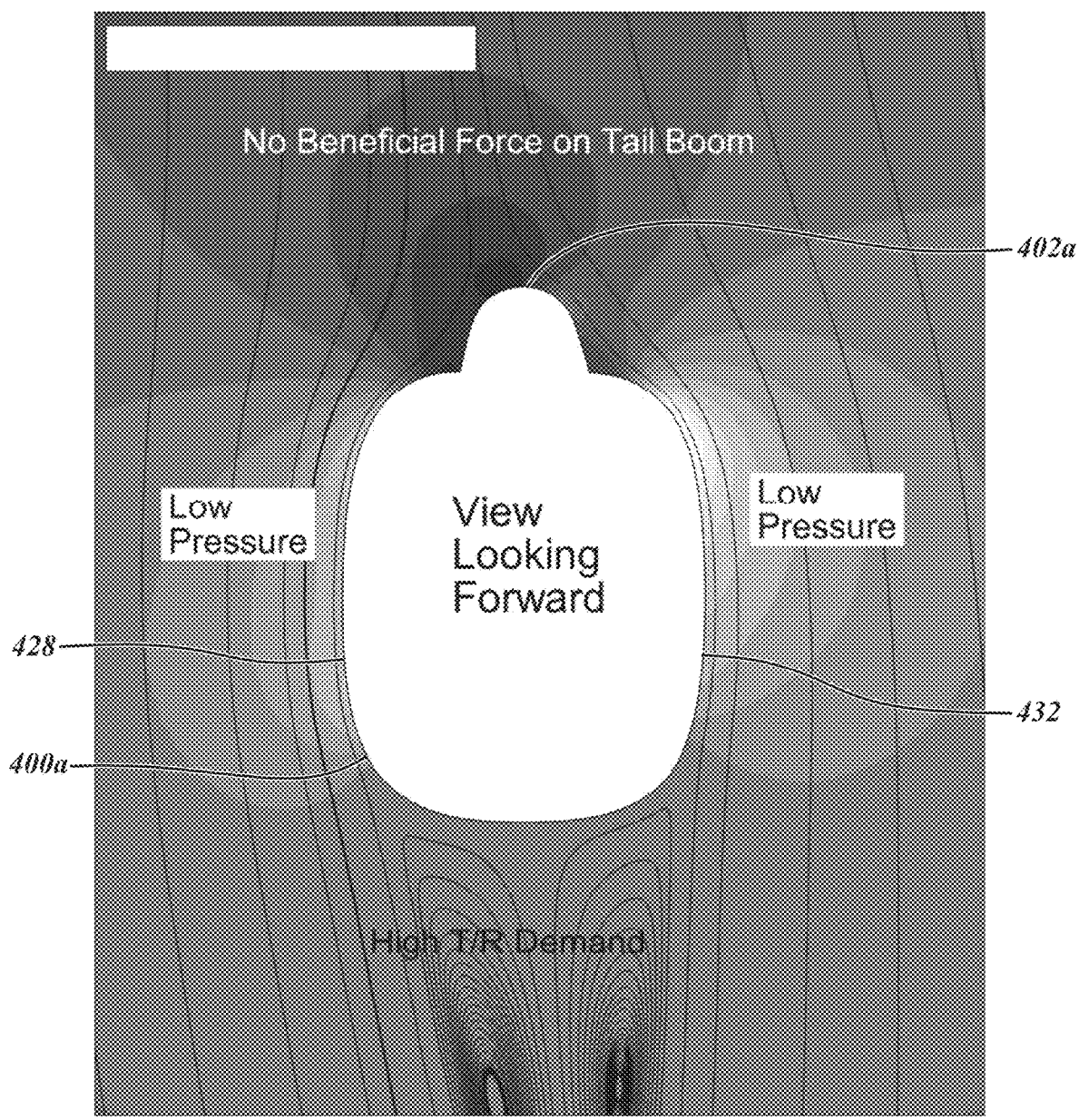
FIG. 4A is a plot of pressure distribution due to downdrafts from a main rotor passing over a tail boom of a helicopter without strakes or vortex generators with a symmetric tail boom profile, the tail boom having an unmodified non-circular or oblong profile.

FIG. 4A shows a pressure distribution around a conventional tail boom 400a and a tail rotor drive shaft cover 402a of a helicopter produce using computational fluid dynamics (CFD), the tail boom 400a having a non-circular or oblong cross-sectional profile, and the tail section without strakes, vortex generators or fairing to produce an asymmetric cross-sectional profile.

As visible in FIG. 4A, the conventional tail boom 400a develops a substantial amount of low pressure on the approaching side 428 of the tail boom 400a, and an even more substantial amount of low pressure on the retreating side 432 of the tail boom. The lift generated by the difference in pressure between the approaching and retreating sides 428, 432 is a function of the distribution of pressures between the approaching side 428 and the retreating side 432.

Figure 4B:
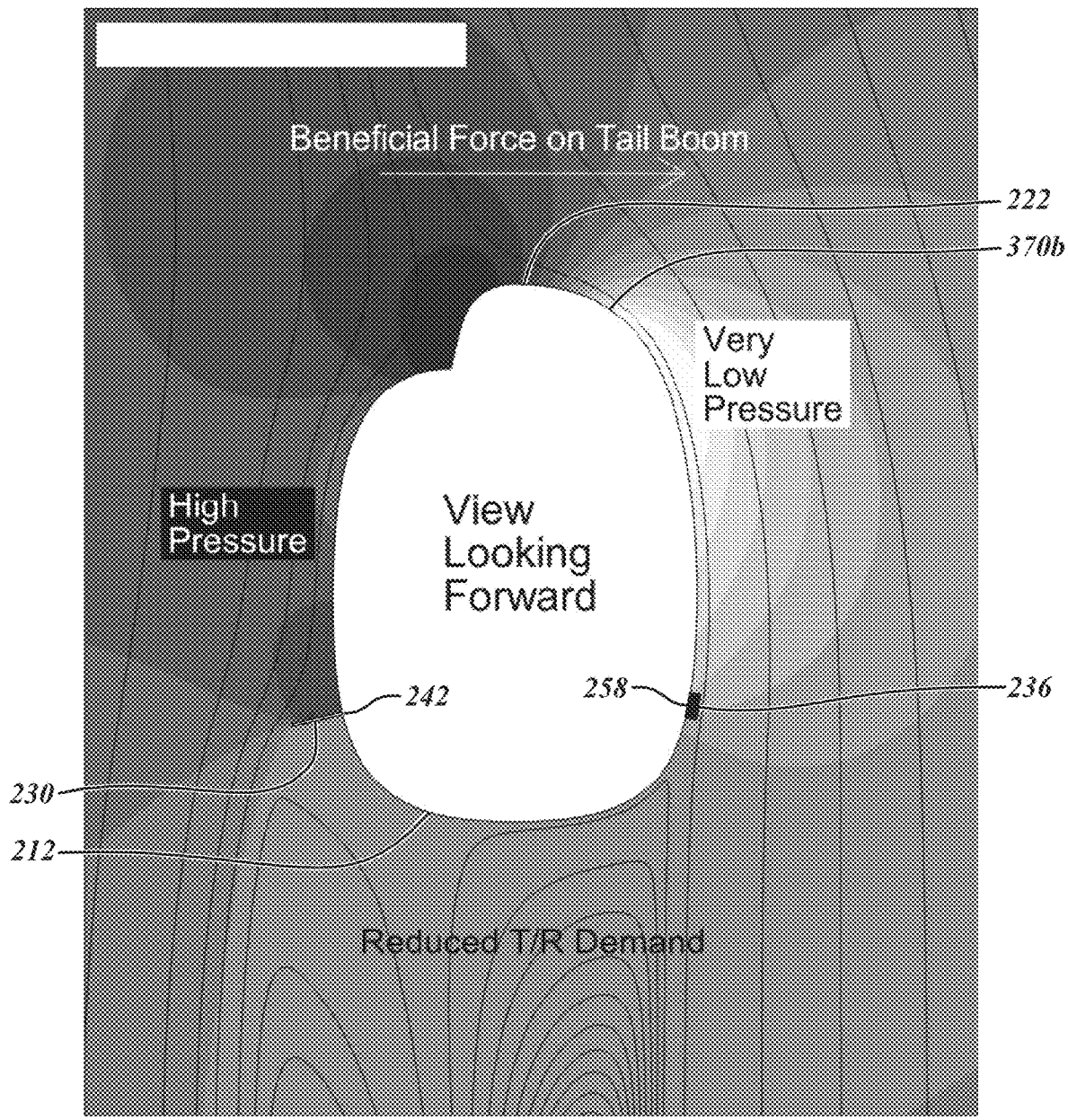
FIG. 4B is a plot of pressure distribution due to downdrafts from a main rotor passing over a tail boom of a helicopter which includes a strake on an approaching side positioned at a first strake position, vortex generators on a retreating side of the tail boom positioned at a vortex generator position, and a fairing that creates an asymmetric profile similar to that of FIG. 3A or 3B, the tail boom having an unmodified non-circular or oblong profile.

FIG. 4B shows a pressure distribution around a tail boom 212 and a tail rotor drive shaft cover 222 of a helicopter 300b produced using computational fluid dynamics (CFD), the tail boom 212 having a non-circular cross-sectional profile (FIG. 3B), and the tail section 104 (FIGS. 1A, 1B) having a first strake 230 that extends along at least a portion of a length 126 (FIGS. 1A, 1B) of the tail boom 212 at a first strake position 242 (FIG. 2C), a plurality of vortex generators 236 that extend along at least a portion of the length 126 (FIGS. 1A, 1B) of the tail boom 212 at a vortex generator position 258 (FIG. 2C), and a fairing 370b attached to the tail boom 212 to provide the tail section 104 (FIGS. 1A, 1B) with an asymmetric cross-sectional profile. While similar or even identical to that of FIG. 3B, a similar pressure distribution would result from the configuration of FIG. 3A.

As visible in FIG. 4B, the inclusion of a properly positioned first strake 230, vortex generators 236 and fairing 370b significantly increases the lift generated by the difference in pressure between the approaching and retreating sides 228, 232. As compared to FIG. 4A, the low pressure on the approaching side 228 of the tail boom 212 is significantly reduced by the structures, while the low pressure on the retreating side 232 is significantly enhanced. This change in pressure substantially aids in countering main rotor torque. This improved pressure distribution results in horsepower savings by at least partially counteracting the reaction torque produced by rotation of the main rotor. It also improves directional control by reducing loss of tail rotor effectiveness.

Figure 4C:
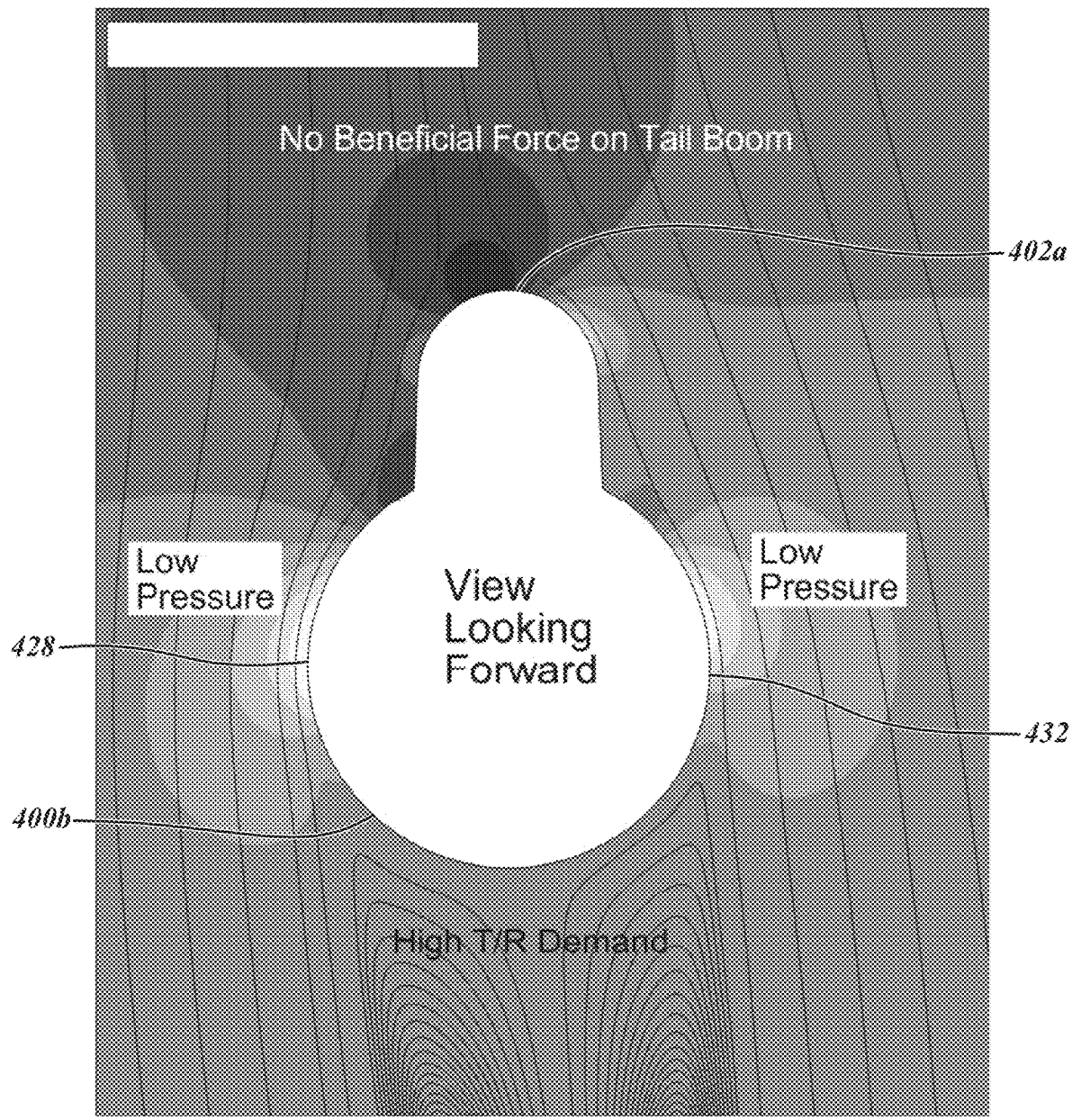
FIG. 4C is a plot of pressure distribution due to downdrafts from a main rotor passing over a tail boom of a helicopter without strakes or vortex generators with a symmetric tail boom profile, the tail boom having an unmodified circular profile.

FIG. 4C shows a pressure distribution around a conventional tail boom 400b and a tail rotor drive shaft cover 402b of a helicopter produce using computational fluid dynamics (CFD), the tail boom 400b having a circular or oblong cross-sectional profile, and the tail section without strakes, vortex generators or fairing to produce an asymmetric cross-sectional profile.

As visible in FIG. 4C, the conventional tail boom 400b develops a substantial amount of low pressure on the approaching side 428 of the tail boom 400b, and an even more substantial amount of low pressure on the retreating side 432 of the tail boom. The lift generated by the difference in pressure between the approaching and retreating sides 428, 432 is a function of the distribution of pressures between the approaching side 428 and the retreating side 432.

Figure 4D:
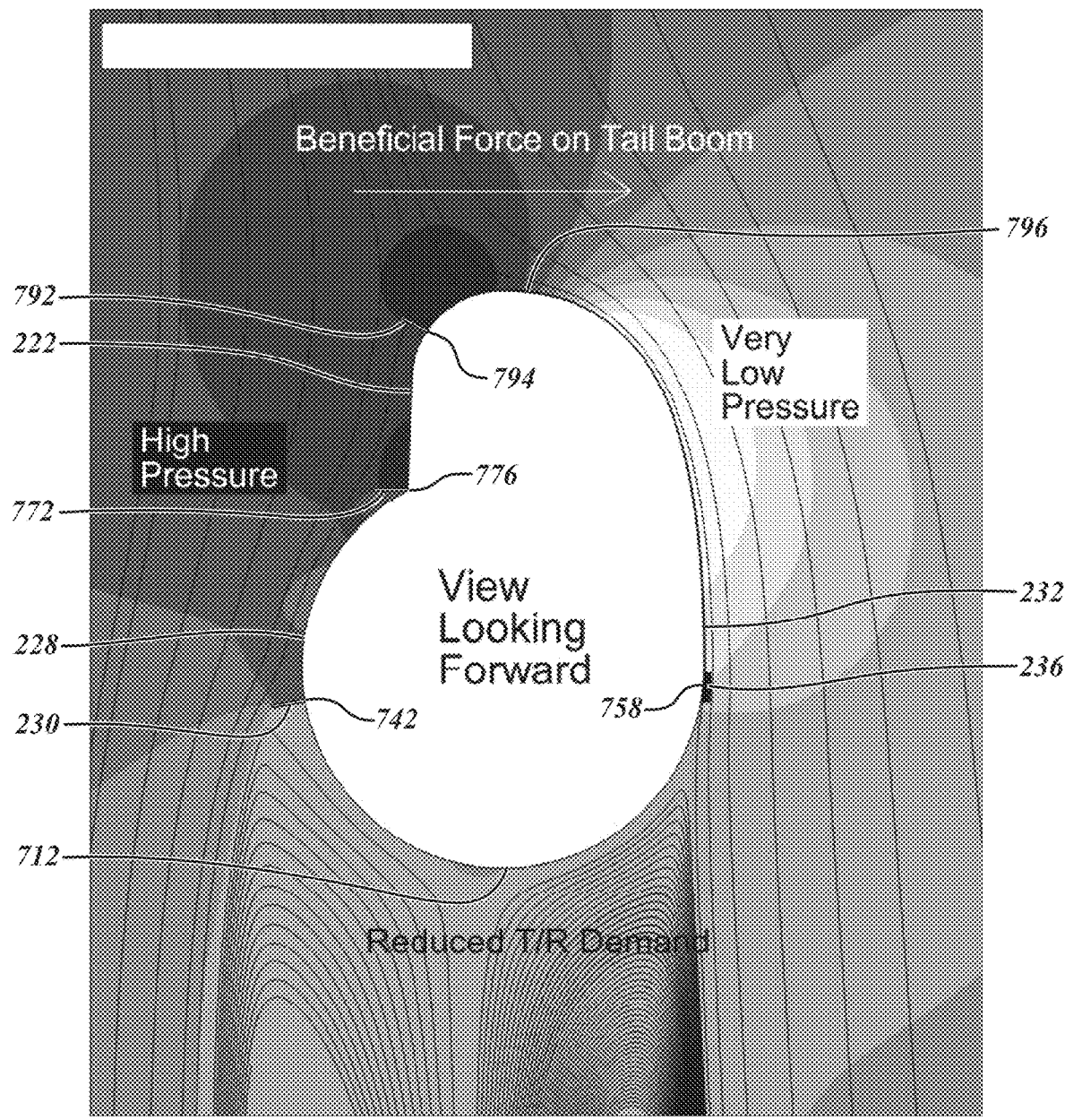
FIG. 4D is a plot of pressure distribution due to downdrafts from a main rotor passing over a tail boom of a helicopter which includes first, second and third strakes on an approaching side, vortex generators on a retreating side of the tail boom positioned at a vortex generator position, and a fairing that creates an asymmetric profile similar to that of FIG. 3A or 3B, the tail boom having an unmodified circular profile.
Figure 7:
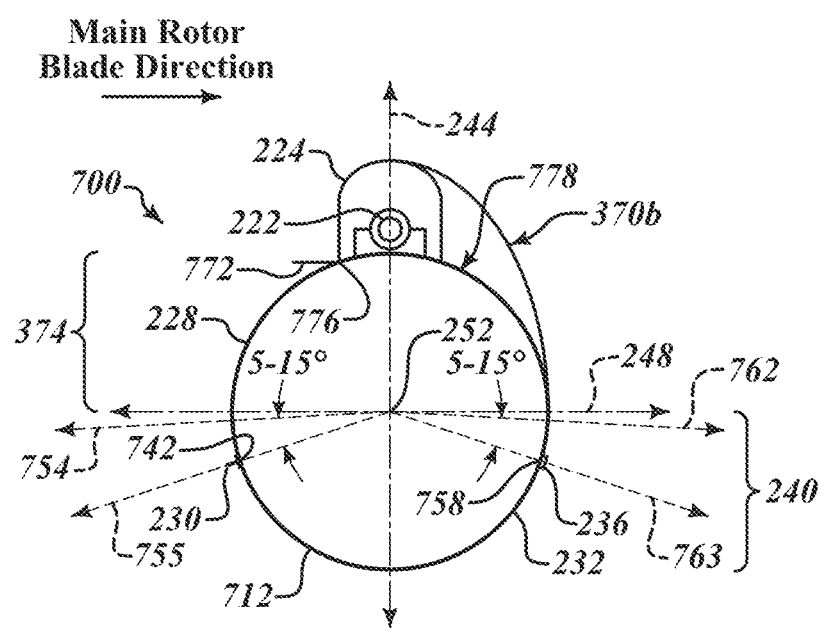
FIG. 7 is a cross-sectional view of a tail boom and tail rotor shaft cover of the helicopter, the tail boom having a circular cross-sectional profile, which may be modified with a fairing, and which includes first and second strakes on an approaching side and vortex generators on a retreating side of the tail boom.

FIG. 4D shows a pressure distribution around a tail boom 712 and a tail rotor drive shaft cover 222 of a helicopter 100 (FIGS. 1A, 1B) produced using computational fluid dynamics (CFD), the tail boom 712 having circular cross-sectional profile (FIG. 7). The tail section 104 (FIGS. 1A, 1B) has a first strake 230 that extends along at least a portion of a length 126 (FIGS. 1A, 1B) of the tail boom 712 at a first strake position 742 (FIG. 7). The first strake position 742 is spaced approximately 5 degrees to 15 degrees below a horizontal midplane 248 of the tail boom 712 on the approaching side 228, best illustrated in FIG. 7. The tail section 104 (FIGS. 1A, 1B) optionally has a second strake 772 at a second strake position 776. The second strake position 776 is proximate a position where the tail rotor drive shaft cover 222 joins the tail boom 712 (e.g., within a few inches). The tail section 104 (FIGS. 1A, 1B) optionally has a third strake 792 at a third strake position 794. The third strake position 794 is proximate a vertical apex 796 of the tail rotor drive shaft cover 222 or a fair 370b. The tail section 104 (FIGS. 1A, 1B) has a plurality of vortex generators 236 that extend along at least a portion of the length 126 (FIGS. 1A, 1B) of the tail boom 712 at a vortex generator position 758 (FIG. 2C). The vortex generator position 758 is spaced approximately 5-15 degrees below a horizontal midplane 248 of the tail boom 712 on the retreating side 232, best illustrated in FIG. 7, mirrored across a vertical axis 244 from the first strake 230. The tail section 104 (FIGS. 1A, 1B) optionally has a fairing 370b attached to the tail boom 712 to provide the tail section 104 (FIGS. 1A, 1B) with an asymmetric cross-sectional profile. The tail boom 712 is similar to that illustrated in FIG. 7, although adds the third strake 792.

As visible in FIG. 4D, the inclusion of a properly positioned first strake 230, vortex generators 236 at first strake and vortex generator positions 742, 758, respectively, and addition of fairing 370b significantly increases the lift on the retreating side 232 generated by the difference in pressure between the approaching and retreating sides 228, 232. Further addition of second strake 772 and/or third strake 792 at second and third strake positions 776, 796, respectively may also increase lift on the retreating side 232 relative to the conventional tail boom 400b. As compared to FIG. 4A, the low pressure on the approaching side 228 of the tail boom 712 is significantly reduced by the structures, while the low pressure on the retreating side 232 is significantly enhanced. This change in pressure substantially aids in countering main rotor torque. This improved pressure distribution results in horsepower savings by at least partially counteracting the reaction torque produced by rotation of the main rotor. It also improves directional control by reducing loss of tail rotor effectiveness.

Figure 5:
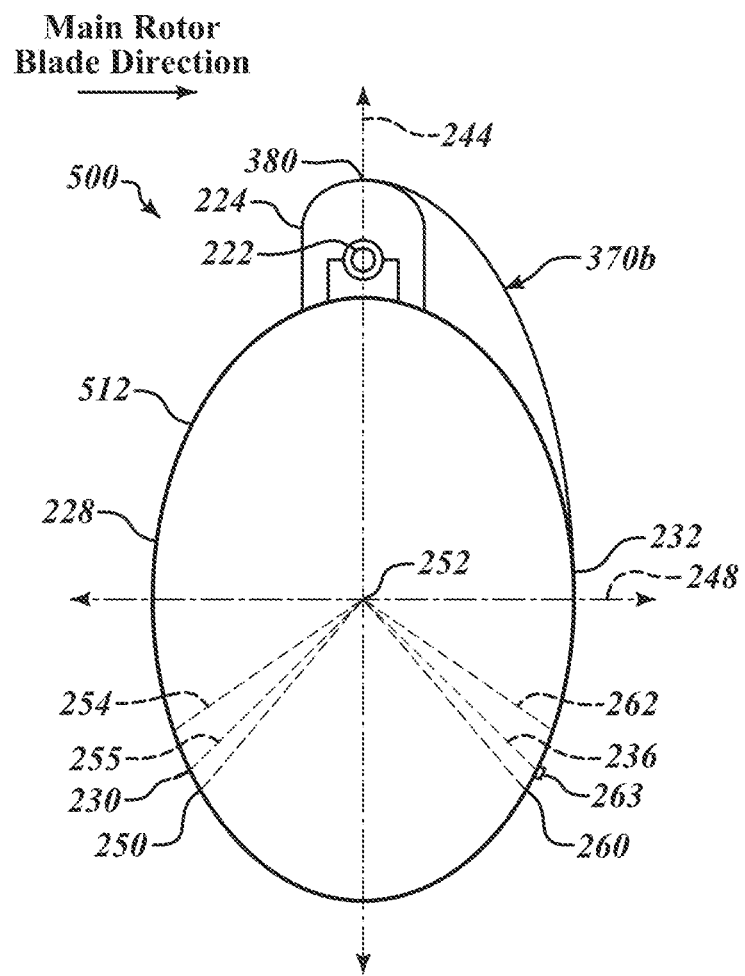
FIG. 5 is a cross-sectional view of a tail boom and tail rotor shaft cover of the helicopter, the tail boom having a highly elliptical cross-sectional profile, which may be modified with a fairing, and which includes a strake on an approaching side and vortex generators on a retreating side of the tail boom.

FIG. 5 shows a portion of a helicopter 500, according to one illustrated embodiment.

The helicopter 500 may be similar or even identical to the helicopter 100 (FIGS. 1A and 1B), helicopter 200 (FIGS. 2A-2C), helicopters 300a, 300b (FIGS. 3A, 3B). The helicopter 500b includes many of the same or similar structures to that illustrated in FIGS. 2A-2C. Identical or similar are denominated with the same reference numbers as employed in FIGS. 2A-2C, 3A and 3B. Some structures are not specifically called out in FIG. 6 to enhance drawing legibility. Only significant differences with that of FIGS. 2A-2C, 3A and 3B are discussed below.

In contrast to the tail booms 212 illustrated in FIGS. 2A-2C, 3A and 3B, FIG. 5 shows a tail boom 512 that has a highly elliptical non-circular cross-sectional profile. As previously noted, for tail booms 512 having highly oblong or highly elliptical non-circular cross-sectional profiles, it is advantageous to employ a first strake 230 on the approaching side 228 at a first strake position 242, a plurality of vortex generators 236 on the retreating side 232 at a vortex generator position 258, a faring 370a, 370b, and to omit additional strakes in the upper half 374 of the approaching side 228. The first strake 230, vortex generators 237, and fairing 370b at least partially counteract main rotor torque produced by the main rotor 106, and form as at least part of the anti-torque system.

The first strake 230, vortex generators 237, and fairing 370b can be supplied as an aftermarket kit, along with instructions 371 (FIGS. 3A, 3B) for installing such at the various locations described herein. Alternatively, the fairing may be part of the helicopter as manufactured and/or delivered by an OEM.

Figure 6:
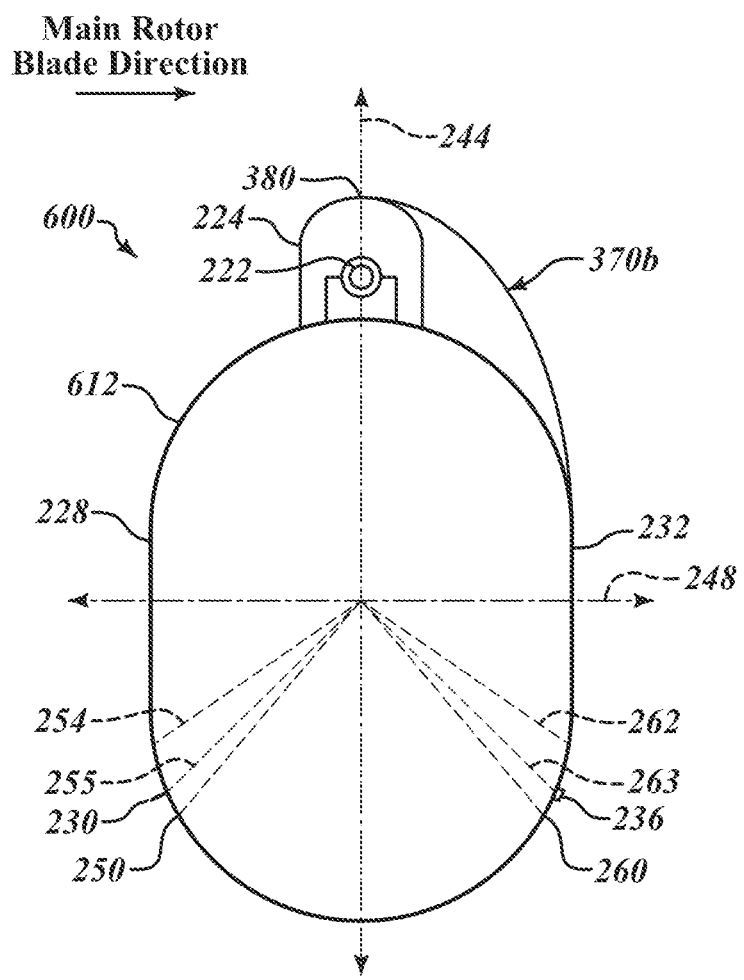
FIG. 6 is a cross-sectional view of a tail boom and tail rotor shaft cover of the helicopter, the tail boom having a highly oblong cross-sectional profile, which may be modified with a fairing, and which includes a strake on an approaching side and vortex generators on a retreating side of the tail boom.

FIG. 6 shows a portion of a helicopter 600, according to one illustrated embodiment.

The helicopter 600 may be similar or even identical to the helicopter 100 (FIGS. 1A and 1B), helicopter 200 (FIGS. 2A-2C), helicopters 300a, 300b (FIGS. 3A, 3B), and/or helicopter 500 (FIG. 5). The helicopter 600b includes many of the same or similar structures to that illustrated in FIGS. 2A-2C. Identical or similar are denominated with the same reference numbers as employed in FIGS. 2A-2C, 3A, 3B, and 5. Some structures are not specifically called out in FIG. 6 to enhance drawing legibility. Only significant differences with that of FIGS. 2A-2C, 3A, 3B, and 5 are discussed below.

In contrast to the tail booms 212 illustrated in FIGS. 2A-2C, 3A and 3B, FIG. 6 shows a tail boom 612 that has a highly oblong non-circular cross-sectional profile. Portions of the tail boom 612 can have a radius of curvature that is infinite or almost infinite, for instance the essentially vertical portions illustrated in FIG. 6 that extend immediately above and below the horizontal axis or midplane 248. As previously noted, for tail booms 612 having highly oblong or highly elliptical non-circular cross-sectional profiles, it is advantageous to employ a first strake 230 on the approaching side 228 at a first strake position 242, a plurality of vortex generators 236 on the retreating side 232 at a vortex generator position 258, a faring 370a, 370b, and to omit additional strakes in the upper half 374 of the approaching side 228. The first strake 230, vortex generators 237, and fairing 370b at least partially counteract main rotor torque produced by the main rotor 106, and form as at least part of the anti-torque system.

The first strake 230, vortex generators 237, and fairing 370b can be supplied as an aftermarket kit, along with instructions 371 (FIGS. 3A, 3B) for installing such at the various locations described herein. Alternatively, the fairing may be part of the helicopter as manufactured and/or delivered by an OEM.

FIG. 7 shows a portion of a helicopter 700, according to one illustrated embodiment.

The helicopter 700 may be similar or even identical to the helicopter 100 (FIGS. 1A and 1B), helicopter 200 (FIGS. 2A-2C), helicopters 300a, 300b (FIGS. 3A, 3B), helicopter 500 (FIG. 5) and/or helicopter 600 (FIG. 6). The helicopter 700b includes many of the same or similar structures to that illustrated in FIGS. 2A-2C. Identical or similar are denominated with the same reference numbers as employed in FIGS. 3A, 3B, 5, and 6. Some structures are not specifically called out in FIG. 7 to enhance drawing legibility. Only significant differences with that of FIGS. 2A-2C, 3A, 3B, 5, and 6 are discussed below.

In contrast to the tail booms 212, 512, and 612 illustrated in the FIGS. 2A-2C, 5 and 6, the tail boom 712 has a circular cross-sectional profile. Since the tail boom 712 has a constant radius of curvature or constant change in curvature of the surface of the tail boom 712, positioning of strake(s) and vortex generators will be specified differently from those described above. Using CFD, applicant has determined positions for the first strake, vortex generators, and optionally second strake to enhance performance for a tail boom 712 with a circular cross-sectional profile.

A first strake 230 is positioned on an approaching side 228 of the tail boom 712, extending outwardly of the approaching side 228, along at least a portion of a length 126 (FIGS. 1A, 1B) of the tail boom 712, on a lower half 240 of the tail boom 712 at a first strake position 742.

The first strake position 742 is located or positioned below a horizontal midplane 248 of the tail boom 712, at an angle of from approximately 5 degrees to 15 degrees when viewed along a length of the tail boom 712, the angle measured between the horizontal midplane 248, a center point or centerline 252 and a ray 755 that extends from the center point or centerline 252 to the first strake position 742. The ray 755 represents 15 degrees from the horizontal midplane 248. A ray 754 represents 5 degrees from the horizontal midplane 248.

A number of vortex generators 236 are positioned on an retreating side 232 of the tail boom 712, extending outwardly of the approaching side, along at least a portion of a length 126 (FIGS. 1A, 1B) of the tail boom 212, on the lower half 240 of the tail boom 712 at a vortex generator position 758.

The vortex generator position 758 is located or positioned below a horizontal midplane 248 of the tail boom 712, at an angle of from approximately 5 degrees to 15 degrees when viewed along a length of the tail boom 712, the angle measured between the horizontal midplane 248, a center point or centerline 252 and a ray 763 that extends from the center point or centerline 252 to the vortex generator position 758. The ray 763 represents 15 degrees from the horizontal midplane 248. A ray 762 represents 5 degrees from the horizontal midplane 248.

The faring 370b is optional, and could be either omitted, or replaced with fairing 370a (FIG. 3A). The faring 370b provides the tail section 104 (FIGS. 1A, 1B) with an asymmetrical cross-sectional profile, shaped to produce lift on the retreating side 228.

Optionally, a second strake 772 is positioned on the approaching side 228 of the tail boom 712, extending along at least a portion of a length 126 (FIGS. 1A, 1B) of the tail boom 212, on an upper half 374 of the tail boom 712 at a second strake position 776. The second strake position 776 is preferably within a few inches of where the fairing 370b joins the tail boom 712 on an upper portion 778 of the tail boom 212. The second strake 772 may be employed with tail booms having a circular cross-sectional profile or almost circular cross-sectional profiles (e.g., FIG. 3A), and which are not overly elongated or overly elliptical (e.g., FIG. 6). Applicants have found it advantageous to omit a second strake 772, at least for tail booms with overly elongated or overly elliptical cross-sectional profiles. The second strake 772 adds weight, and tends to create a down force penalty, so any advantage in producing flow separation on the approaching side 228 is at least partially, if not wholly, offset.

The strake(s) 230, 772, vortex generators 236, and optional fairing 370b at least partially counteracts main rotor torque produced by the main rotor 106, and constitutes at least part of the anti-torque system.

The strake(s) 230, 772, vortex generators 237, and fairing 370b can be supplied as an aftermarket kit, along with instructions 371 (FIGS. 3A, 3B) for installing such at the various locations described herein. Alternatively, the fairing may be part of the helicopter as manufactured and/or delivered by an OEM.

Figure 8:
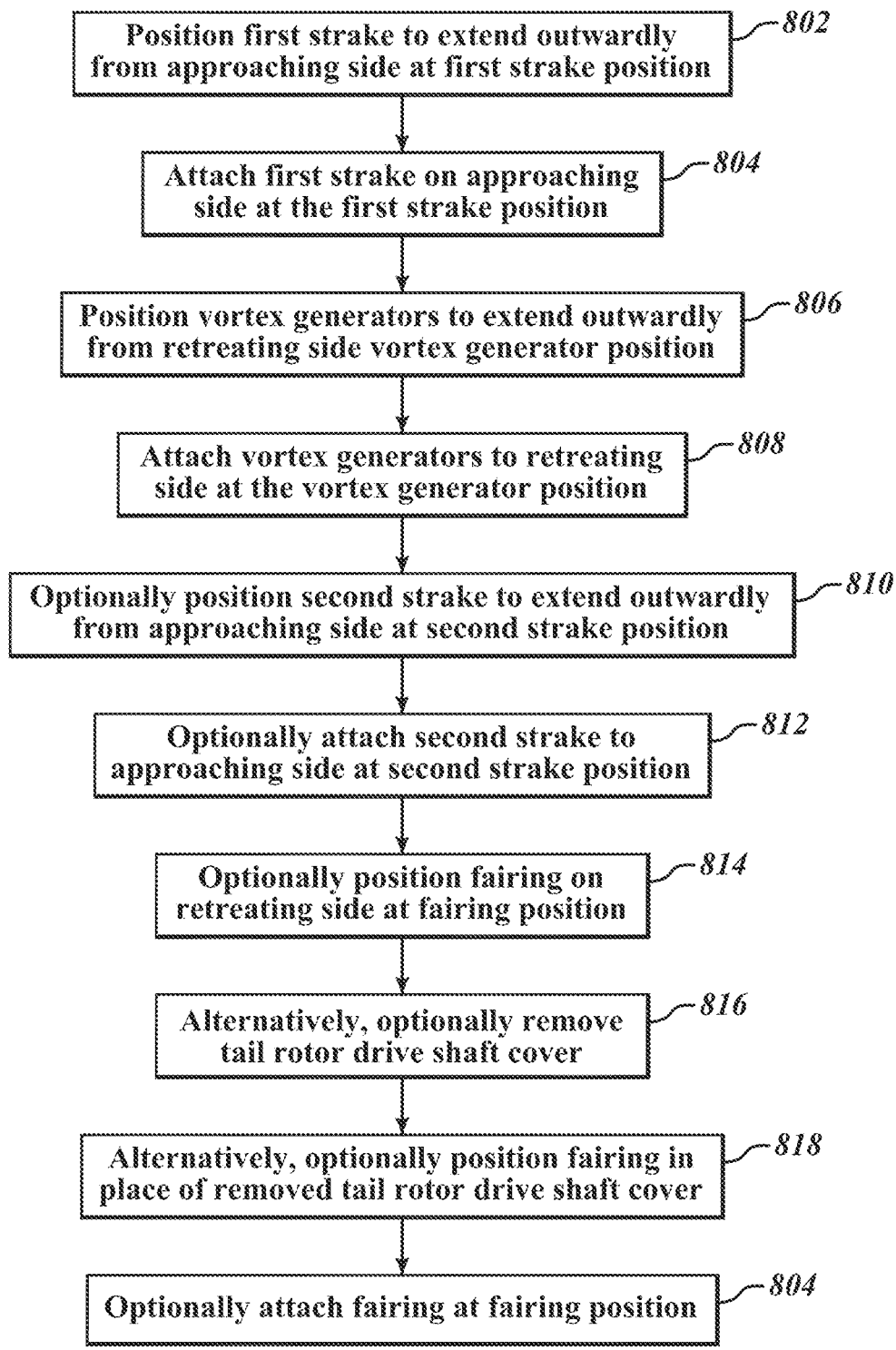
FIG. 8 is a flow chart of a method for manufacturing a helicopter or modifying a tail section of a helicopter, according to one embodiment.

FIG. 8 shows a method 800 manufacturing a helicopter or modifying a tail section of a helicopter, according to one embodiment. The method 800 may be employed during construction, fabrication or manufacturing of the helicopter, for example by an original equipment manufacturer (OEM) or vendor of the OEM, prior to delivery of the helicopter to a purchaser or end user. Alternatively, the method 800 may be employed after manufacture or delivery of the helicopter by the OEM. For example, the method 800 may be performed using an aftermarket retrofit kit, which may include one or more strakes, vortex generators, fairings, and instructions (e.g., textual, diagrams, graphics, audio, in written form or on nontransitory computer-readable media) for preforming the method.

At 802, a first strake is positioned to extend outwardly from the approaching side of the tail boom at a first strake position. The first strake position is dependent on a shape of the cross-sectional profile of the tail boom.

For example, for tail booms having non-circular cross-sectional profiles, the first strake position is located or positioned below the horizontal midplane of the tail boom, at an angle of from approximately 5 degrees to 15 degrees, when viewed along a length of the tail boom, above a location at which a change in the radius of curvature of the approaching side below the horizontal plane is greatest, the angle measured between the location at which a change in the radius of curvature of the approaching side below the horizontal plane is greatest, the center point or centerline and an axis that extends from the centerline to the first strake position.

Alternatively, for a tail boom with a non-circular (e.g., elliptical or oblong) cross-sectional profile, the first strake position is positioned, oriented and/or located on the approaching side of the tail boom, on a lower half of the tail boom, such that an upstanding leg of the first strake is normal to the boom surface and from approximately 10 degrees to approximately 16 degrees, or more preferably approximately 13 degrees to approximately 14 degrees to the horizontal (e.g., horizontal axis or midplane), where the upstanding leg is at an approximately right angle to a base of the first strake, which attaches the first strake to the tail boom.

For example, for tail booms having circular cross-sectional profiles, the first strake position is located or positioned below a horizontal midplane of the tail boom, at an angle of from approximately 5 degrees to 15 degrees when viewed along a length of the tail boom, the angle measured between the horizontal midplane, a center point or centerline and a ray that extends from the center point or centerline to the first strake position.

At 804, the first strake attached or fixed on the approaching side of the tail boom at the first strake position. For example, the first strake may be attached via fasteners, nut plates, rivets, or the like.

At 806, a plurality of vortex generators are positioned to extend outwardly from the retreating side of the tail boom at a vortex generator position. The vortex generator position is dependent on a shape of the cross-sectional profile of the tail boom. For example, for tail booms having non-circular cross-sectional profiles, the vortex generator position is located or positioned below the horizontal midplane of the tail boom, at an angle of from approximately 5 degrees to 15 degrees, when viewed along a length of the tail boom, above a location at which a change in the radius of curvature of the approaching side below the horizontal plane is greatest, the angle measured between the location at which a change in the radius of curvature of the approaching side below the horizontal plane is greatest, the center point or centerline and an axis that extends from the centerline to the vortex generator position. For example, for tail booms having circular cross-sectional profiles, the vortex generator position is located or positioned below a horizontal midplane of the tail boom, at an angle of from approximately 5 degrees to 15 degrees when viewed along a length of the tail boom, the angle measured between the horizontal midplane, a center point or centerline and a ray that extends from the center point or centerline to the vortex generator position.

At 808, the vortex generators are attached or fixed to the retreating side of the tail boom at the vortex generator position. For example, the vortex generators may be attached via fasteners, nut plates, rivets, or the like. The vortex generators can be attached or bonded to the modified tail boom individually; installed as a single assembly, such as a long strip with the vortex generator pattern integral to it, attached to the boom: or as an integral part of the redesigned shaft cover or other aerodynamic fairing, that is attached to an unmodified tail boom.

For example, the vortex generators may be spaced a distance d (approximately 3 inches to 6 inches) apart at an angle α of about 10° to about 30° off a vertical axis. By way of reference, a 0° placement would have the long axis of the vortex generator perpendicular to the centerline axis of the boom. The vortex generator placement off the vertical axis of 10° to 30° can result in the vortex generators being canted either forward or aft. The vortex generators can all be angled the same relative to a vertical axis, or can alternate back and forth along the tail boom as shown in FIG. 2B.

Optionally at 810, a second strake is positioned to extend outwardly from the approaching side of the tail boom at a second strake position. The second strake position is located within two inches above or below a location at which the drive shaft cover joins the approaching side of the tail boom. The inclusion of a second strake may be dependent on a shape of the cross-sectional profile of the tail boom. For example, for tail booms having circular cross-sectional profiles, a second or upper strake may produce sufficient benefit to justify inclusion. For tail booms having non-circular cross-sectional profiles, a second or upper strake may produce sufficient benefit to justify inclusion if the particular non-circular cross-sectional profile is not overly elongated.

Optionally at 812, the second strake is fixed to the approaching side of the tail boom at the second strake position. For example, the second strake may be attached via fasteners, nut plates, rivets, or the like.

Optionally at 814, a fairing is positioned on the retreating side of the tail boom at a fairing position to create an asymmetry between the approaching and the retreating side of the tail boom. For example, the fairing may be positioned to extend from an apex of a tail rotor drive shaft cover, down to where the horizontal midplane of the tail boom intersects the retreating side of the tail boom.

Alternatively, optionally at 816, a tail rotor drive shaft cover is removed. Optionally at 818, a fairing is positioned in place of the removed tail rotor drive shaft cover to cover the tail rotor drive shaft at a fairing position to create an asymmetry between the approaching and the retreating side of the tail boom.

Thus, modifying a tail boom of a helicopter may include removing a first rotor drive shaft cover from the tail boom, in which the first rotor drive shaft cover including a first external surface that is substantially symmetrical about a vertical plane of the tail boom when installed on the tail boom; and installing a second rotor drive shaft cover on the tail boom, in which the second drive shaft cover including a second external surface that is asymmetrical about the vertical plane of the tail boom when installed on the tail boom. The second external surface may include a plurality of vortex generators.

Optionally at 820, the fairing is fixed at the fairing position. For example, the fairing may be attached via fasteners, nut plates, rivets, or the like.

Although some of the examples relate to adding strake(s) and/or vortex generators to a tail boom that has been modified to include an asymmetrical profile, the present disclosure also encompasses applying strake(s) and/or vortex generators to a tail boom that includes an asymmetrical shape without additional modification. For example, applying vortex generators to the opposite side of helicopters with asymmetrical tail booms, such as the Augusta Westland AW169 and the Bell 525 Relentless, can improve the performance of these aircraft. Further, the tail boom modifications disclosed herein can be incorporated into a wide range of helicopters. As used herein, the term "helicopter" includes, without limitation, rotorcraft aircraft, rotary-wing aircraft, or other heavier-than-air aircraft that are lifted and sustained in the air horizontally by rotating wings or blades turning about a vertical axes using power supplied by an engine. For example, helicopters including the Bell UH-1, Bell Huey II, Sikorsky UH-60, and Eurocopter HH-65A Dolphin helicopters are well suited for retrofitting with the tail boom systems disclosed herein. The various embodiments described above can be combined to provide further embodiments.

The embodiments, features, systems, devices, materials, methods and techniques described herein may, in certain embodiments, be applied to or used in connection with any one or more of the embodiments, features, systems, devices, materials, methods and techniques disclosed in U.S. Provisional Patent Application Nos. 60/930,233; 61/816,507; 62/188,305 and U.S. Pat. Nos. 4,708,305; 6,869,045; 7,063,289; 8,210,468; 8,985,503; and 8,991,747. The above-mentioned U.S. Provisional Patent Application Nos. 60/930,233; 61/816,507; 62/188,305 and U.S. Pat. Nos. 4,708,305; 6,869,045; 7,063,289; 8,210,468; 8,985,503; and 8,991,747 are hereby incorporated by reference herein. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A helicopter, comprising:
   a fuselage;
   a main rotor coupled to the fuselage and that in operation rotates in a first rotational direction with respect to the fuselage;
   a tail boom that extends rearwardly of the fuselage, the tail boom having an approaching side and a retreating side, the approaching side being a side of the tail boom that the main rotor approaches when rotating in the first rotational direction, the retreating side being a side of the tail boom that the main rotor retreats from when rotating in the first rotational direction, the retreating side opposite the approaching side across a width of the tail boom, the approaching side of the tail boom having a constant radius of curvature about a centerline, and the tail boom having an upper half, a lower a half and a horizontal plane that extends between the upper half and the lower half of the tail boom;
   a strake that extends outwardly from the approaching side of the tail boom, the strake positioned below the horizontal plane of the tail boom at an angle of from approximately 5 degrees to 15 degrees, the angle measured between the horizontal plane and an axis that extends from the centerline to the strake; and
   at least one vortex generator that extends outwardly from the retreating side of the tail boom, the at least one vortex generator positioned below the horizontal plane of the tail boom at an angle of from approximately 5 degrees to 15 degrees, the angle measured between the horizontal plane and an axis that extends from the centerline to the at least one vortex generator.

2. The helicopter of claim 1 wherein the tail boom has a longitudinal axis, the strake is a retrofit strake and extends parallel to the longitudinal axis of the tail boom, and the vortex generator extends nonparallel to the longitudinal axis of the tail boom.

3. The helicopter of claim 1, further comprising:
   a tail rotor positioned proximate a distal end of the tail boom and that in operation rotates in a tail rotor rotational direction;
   a tail rotor drive shaft drivingly coupled to the tail rotor; and
   a tail rotor drive shaft cover that extends along the tail boom and which removably covers the tail rotor drive shaft.

4. The helicopter of claim 3 wherein the strake is a first strake, the helicopter further comprising:
   a second strake that extends outwardly from the approaching side of the tail boom, the second strake positioned within two inches above or below a location at which the tail rotor drive shaft cover joins the approaching side of the tail boom.

5. The helicopter of claim 3, further comprising:
   a fairing coupled on the retreating side of the tail boom to create an asymmetry between the approaching and the retreating side of the tail boom.

6. The helicopter of claim 5 wherein the tail rotor drive shaft cover has an apex, and the fairing extends from the apex of the tail rotor drive shaft cover down to where the horizontal plane intersects the retreating side of the tail boom.

7. The helicopter of claim 6 wherein the fairing provides a smooth transition between the apex of the tail rotor drive shaft cover and the retreating side of the tail boom.

8. The helicopter of claim 1, further comprising:
a fairing coupled on the retreating side of the tail boom to create an asymmetry between the approaching and the retreating side of the tail boom.

9. The helicopter of claim 8 wherein the fairing forms a tail rotor drive shaft cover that removably covers the tail rotor drive shaft.

10. The helicopter of claim 1 wherein the tail boom tapers in thickness as the tail boom is traversed from the fuselage to a distal end of the tail boom, the tail boom extends in a vertical plane of the fuselage at an non-right angle from the fuselage, and the horizontal plane of the tail boom is not horizontal to a surface of a ground or a horizontal plane of the fuselage.

11. A method of manufacturing a helicopter having a fuselage, a main rotor coupled to the fuselage and that in operation rotates in a first rotational direction with respect to the fuselage, and a tail boom that extends rearwardly of the fuselage, the tail boom having an approaching side and a retreating side, the approaching side being a side of the tail boom that the main rotor approaches when rotating in the first rotational direction, the retreating side being a side of the tail boom that the main rotor retreats from when rotating in the first rotational direction, the retreating side opposite the approaching side across a width of the tail boom, the approaching side of the tail boom having a constant radius of curvature about a centerline, and the tail boom having an upper half, a lower a half, and a horizontal plane that extends between the upper half and the lower half of the tail boom, the method comprising:
positioning a strake to extend outwardly from the approaching side of the tail boom at a strake position, the strake position located below the horizontal plane of the tail boom at an angle of from approximately 5 degrees to 15 degrees, the angle measured between the horizontal plane and an axis that extends from the centerline to the strake position;
fixing the strake to the approaching side of the tail boom at the strake position
positioning at least one vortex generator to extend outwardly from the retreating side of the tail boom at a vortex generator position, the at least one vortex generator position located below the horizontal plane of the tail boom at an angle of from approximately 5 degrees to 15 degrees, the angle measured between the horizontal plane and an axis that extends from the centerline to the vortex generator position; and
fixing the at least one vortex generator to the retreating side of the tail boom at the vortex generator position.

12. The method of claim 11 wherein the strake is a first strake, the strake position is a first strake position, the helicopter further has a tail rotor positioned proximate a distal end of the tail boom and that in operation rotates in a tail rotor rotational direction, a tail rotor drive shaft drivingly coupled to the tail rotor, and a tail rotor drive shaft cover that extends along the tail boom and which removably covers the tail rotor drive shaft, the method further comprising:
positioning a second strake to extend outwardly from the approaching side of the tail boom at a second strake position, the second strake position located within two inches above or below a location at which the tail rotor drive shaft cover joins the approaching side of the tail boom; and
fixing the second strake to the approaching side of the tail boom at the second strake position.

13. The method of claim 11, further comprising:
positioning a fairing on the retreating side of the tail boom at a fairing position to create an asymmetry between the approaching and the retreating side of the tail boom; and
fixing the fairing at the fairing position.

14. The method of claim 11 wherein the helicopter further has a tail rotor positioned proximate a distal end of the tail boom and that in operation rotates in a tail rotor rotational direction, a tail rotor drive shaft drivingly coupled to the tail rotor; and a tail rotor drive shaft cover that extends along the tail boom and which removably covers the tail rotor drive shaft, the tail rotor drive shaft cover having an apex, and further comprising:
positioning a fairing on the retreating side of the tail boom at a fairing position in which the fairing extends from the apex of the tail rotor drive shaft cover down to where the horizontal plane intersects the retreating side of the tail boom.

15. The method of claim 11 wherein the helicopter further has a tail rotor positioned proximate a distal end of the tail boom and that in operation rotates in a tail rotor rotational direction, a tail rotor drive shaft drivingly coupled to the tail rotor, and a tail rotor drive shaft cover that extends along the tail boom and which removably covers the tail rotor drive shaft, the tail rotor drive shaft cover having an apex, the method further comprising:
removing the tail rotor drive shaft cover; and
positioning a fairing at a fairing position in which the fairing covers the tail rotor drive shaft and extends down a portion of the retreating side of the tail boom.

16. A method of retrofitting a helicopter having a tail boom with an upper half, a lower a half, and a horizontal plane that extends between the upper half and the lower half, the method comprising:
attaching a strake to extend outwardly from an approaching side of the tail boom at a strake position, the strake position located below the horizontal plane at an angle of from approximately 5 degrees to 15 degrees;
positioning at least one vortex generator to extend outwardly from a retreating side of the tail boom, which is opposite the approaching side, at a vortex generator position, the vortex generator position located below the horizontal plane at an angle of from approximately 5 degrees to 15 degrees.

17. The method of retrofitting of claim 16 wherein the strake is a first strake and the strake position in a first strake position, the method further comprising:
positioning a second strake to extend outwardly from the approaching side at a second strake position, the second strake position located within two inches above or below a location at which a tail rotor drive shaft cover joins the approaching side of the tail boom.

18. The method of retrofitting of claim 16, further comprising:
positioning a fairing on the retreating side of the tail boom, which is opposite the approaching side, at a fairing position to create an asymmetry between the approaching side and the retreating side.

19. The method of retrofitting of claim 18 wherein positioning the fairing includes positioning the fairing to extend from an apex of the tail rotor drive shaft down to where the horizontal plane of the tail boom intersects the retreating side of the tail boom.

20. The method of retrofitting of claim 18, further comprising:
- removing a tail rotor drive shaft cover; and
- positioning the fairing to cover a tail rotor drive shaft and extend part way down the retreating side of the tail boom.

* * * * *